(12) United States Patent
Allaire

(10) Patent No.: US 8,342,195 B2
(45) Date of Patent: Jan. 1, 2013

(54) APPARATUS AND METHOD FOR WASHING A VEHICLE

(76) Inventor: Serge Allaire, Boisbriand (CA)

( * ) Notice: Subject to any disclaimer, the term of this patent is extended or adjusted under 35 U.S.C. 154(b) by 848 days.

(21) Appl. No.: 12/043,107

(22) Filed: Mar. 5, 2008

(65) Prior Publication Data

US 2008/0223405 A1 Sep. 18, 2008

Related U.S. Application Data

(60) Provisional application No. 60/906,571, filed on Mar. 13, 2007.

(51) Int. Cl.
*B08B 3/00* (2006.01)
*B08B 3/04* (2006.01)
*B08B 9/00* (2006.01)

(52) U.S. Cl. ........................................................ 134/123
(58) Field of Classification Search .................... 134/123
See application file for complete search history.

(56) References Cited

U.S. PATENT DOCUMENTS

| | | | |
|---|---|---|---|
| 2,465,562 A * | 3/1949 | Hopper et al. | 134/94.1 |
| 3,167,797 A | 2/1965 | Hergonson | |
| 3,368,571 A | 2/1968 | Honorof | |
| 3,701,356 A * | 10/1972 | Hanna et al. | 134/58 R |
| 3,724,472 A | 4/1973 | Jenkins et al. | |
| 3,756,466 A * | 9/1973 | Haase | 222/63 |
| 4,135,533 A | 1/1979 | Gall et al. | |
| 4,679,578 A * | 7/1987 | Miller | 134/123 |
| 4,719,932 A | 1/1988 | Burton | |
| 4,889,147 A * | 12/1989 | Chandler | 134/123 |
| 4,920,997 A * | 5/1990 | Vetter et al. | 134/57 R |
| 5,098,023 A * | 3/1992 | Burke | 239/273 |
| 5,280,855 A * | 1/1994 | Rietsch, Jr. | 239/264 |
| 5,329,949 A | 7/1994 | Moncourtois et al. | |
| 5,638,843 A * | 6/1997 | Strickland | 134/123 |
| 6,000,631 A | 12/1999 | Lamminen et al. | |
| 7,100,621 B2 | 9/2006 | Johnson | |
| 2005/0133071 A1 * | 6/2005 | Brady | 134/56 R |
| 2008/0066790 A1 * | 3/2008 | Rems | 134/123 |

FOREIGN PATENT DOCUMENTS

| | | | |
|---|---|---|---|
| DE | 10240689 A1 * | 3/2004 | |
| EP | 349334 A * | 1/1990 | |
| JP | 62006854 A * | 1/1987 | |

* cited by examiner

*Primary Examiner* — Michael Barr
*Assistant Examiner* — Charles W Kling

(57) ABSTRACT

An apparatus for washing a vehicle having a first lateral side, a second lateral side, and a top side between the first lateral side and the second lateral side. The apparatus comprises a portal for allowing the vehicle to pass therethrough. The apparatus also comprises at least one nozzle mounted to the portal for directing liquid toward the vehicle. The apparatus further comprises a control apparatus for controlling the at least one nozzle to direct liquid toward the vehicle to progressively wash a limited portion of the first lateral side of the vehicle, a limited portion of the second lateral side of the vehicle, and a limited portion of the top side of the vehicle. Also provided is a method for washing a vehicle using such an apparatus.

37 Claims, 15 Drawing Sheets

APPARATUS AND METHOD FOR WASHING A VEHICLE

CROSS-REFERENCE TO RELATED APPLICATION

This patent application claims priority from U.S. Provisional Patent Application No. 60/906,571 filed on Mar. 13, 2007 and hereby incorporated by reference herein.

FIELD OF THE INVENTION

The present invention relates to an apparatus and a method for washing a vehicle such as an automobile.

BACKGROUND

Numerous types of apparatus for washing automobiles are known. Most are intended for commercial usage such as car wash facilities where customers pay fees to have their cars washed by various machines.

Manufacturers of commercial car wash equipment are generally concerned with bringing profitability to their customers. Thus, commercial car wash equipment is typically focused on speed, cost of operation, and cleaning effectiveness. As a result, commercial car wash machines usually require significant liquid flow and pressure to achieve their objectives of speed and efficient cleaning. They also typically include large pumps and motors and other sophisticated mechanisms, with a large number of nozzles working simultaneously, thereby requiring significant space.

Car washing equipment intended for personal or home usage has been envisioned. Such personal washing equipment typically tries to mimic what is done in commercial installations and, by doing so, fails to take into account that these commercial installations are cleaning rapidly and efficiently because they rely on an important water flow supply, industrial electrical power, and a lot of space. Attempts at personal car washing equipment have thus not succeeded to bring effective cleaning with resources normally available in a residential environment (e.g., liquid flow and pressure, electrical power, and space).

Accordingly, there is a need for an improved vehicle washing apparatus that can be used as an alternative to large and sophisticated equipment used in commercial car wash installations, and that is particularly suited for residential or other environments where resources are limited.

SUMMARY OF THE INVENTION

The invention provides an apparatus for washing a vehicle having a first lateral side, a second lateral side, and a top side between the first lateral side and the second lateral side. The apparatus comprises a portal for allowing the vehicle to pass therethrough. The apparatus also comprises at least one nozzle mounted to the portal for directing liquid toward the vehicle. The apparatus further comprises a control apparatus for controlling the at least one nozzle to direct liquid toward the vehicle to progressively wash a limited portion of the first lateral side of the vehicle, a limited portion of the second lateral side of the vehicle, and a limited portion of the top side of the vehicle.

The invention also provides an apparatus for washing a vehicle having a first lateral side, a second lateral side, and a top side between the first lateral side and the second lateral side. The apparatus comprises a portal for allowing the vehicle to pass therethrough. The apparatus also comprises at least one nozzle mounted to the portal for directing pressurized liquid toward the vehicle. The apparatus further comprises a control apparatus for controlling the at least one nozzle to direct pressurized liquid toward the vehicle to progressively wash a limited transverse portion of the vehicle such that pressurized liquid impinges asynchronously on at least two of the first lateral side of the vehicle, the second lateral side of the vehicle, and the top side of the vehicle.

The invention also provides a method for washing a vehicle. The method comprises: providing a portal for passage of the vehicle therethough; and controlling at least one nozzle mounted to the portal to direct liquid toward the vehicle to progressively wash each of a series of limited transverse portions of the vehicle that are adjacent to one another such that each of the limited transverse portions is washed while the vehicle is immobile relative to the portal and the vehicle moves relative to the portal between washing of adjacent ones of the limited transverse portions.

These and other aspects of the invention will become apparent to those ordinarily skilled upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

The description and drawings are only for the purpose of illustrating certain embodiments of the invention and are an aid for understanding. They are not intended to be a definition of the limits of the invention.

DETAILED DESCRIPTION OF EMBODIMENTS

Figure 1:
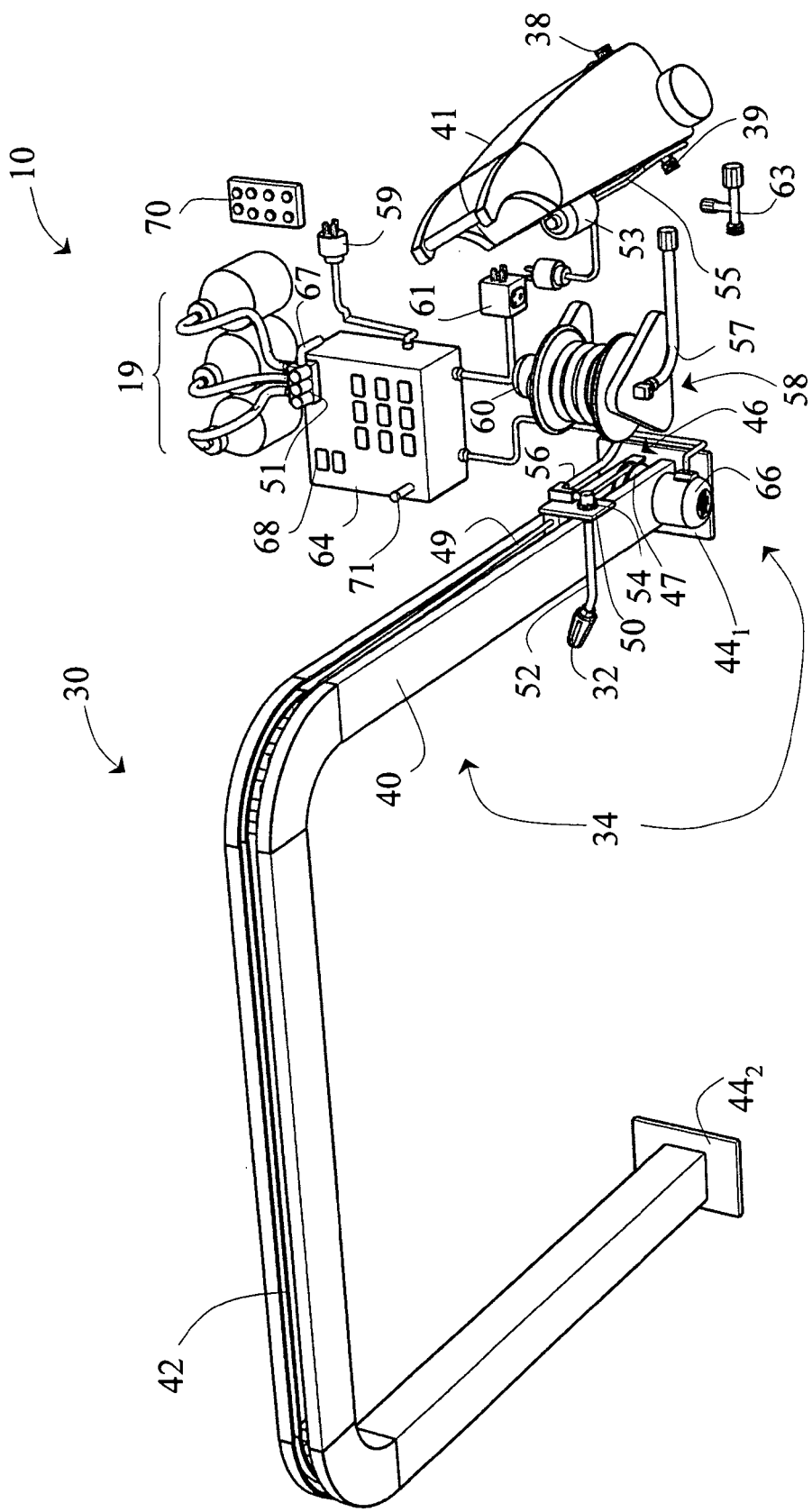
FIG. 1 shows an apparatus for washing a vehicle in accordance with a first embodiment of the invention.
Figure 2:
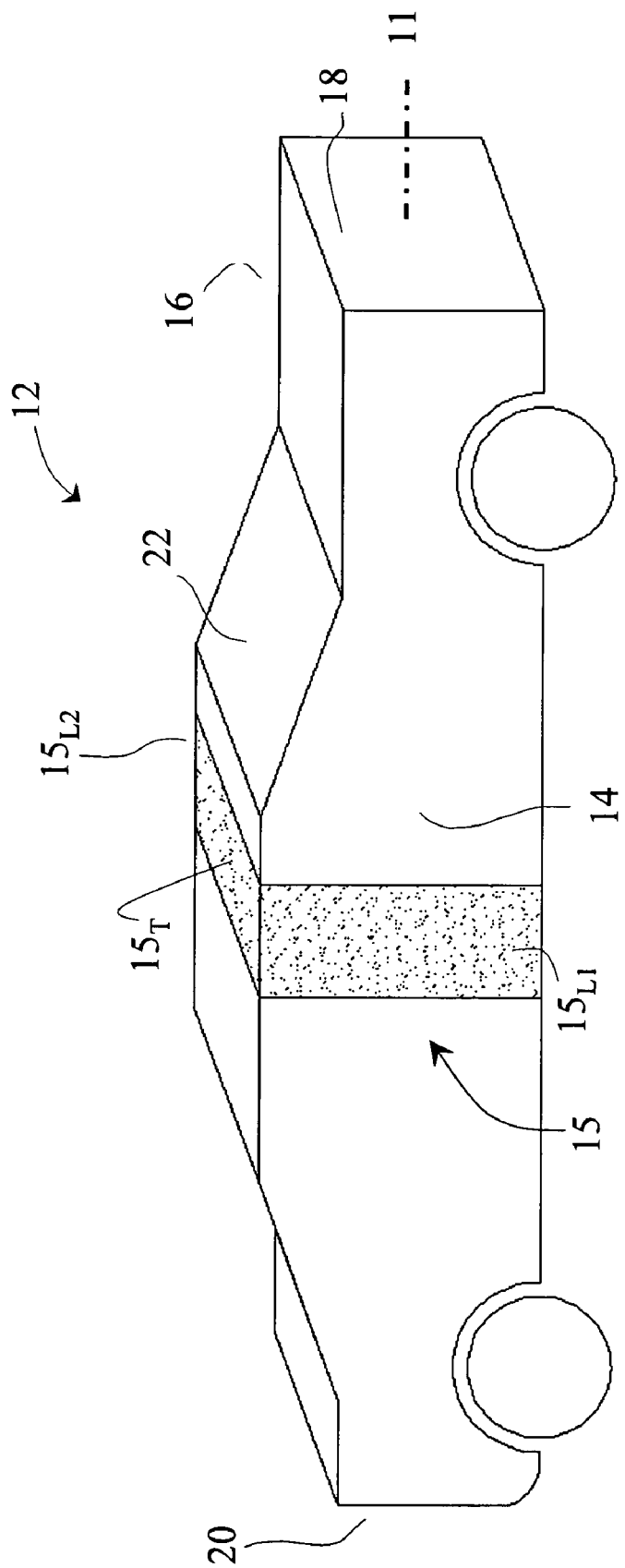
FIG. 2 shows an example of a vehicle.

FIG. 1 shows a washing apparatus 10 for washing a vehicle in accordance with an embodiment of the invention. An example of a vehicle 12 that can be washed by the washing apparatus 10 is shown in FIG. 2. The vehicle 12 has a longitudinal axis 11 and a first lateral side 14, a second lateral side 16, a front side 18, a rear side 20, and a top side 22 located between the first lateral side 14 and the second lateral side 16 and extending from the front side 18 to the rear side 20. While in this example the vehicle 12 is an automobile, in other examples, the vehicle 12 may be a truck, a motorcycle or another motor vehicle.

The washing apparatus 10 comprises a portal 30 for allowing the vehicle 12 to pass therethrough. The washing apparatus 10 also comprises a nozzle 32 mounted to the portal 30 for directing liquid toward the vehicle 12. The washing apparatus 10 further comprises a control apparatus 34 for controlling the nozzle 32 to direct liquid toward the vehicle 12 to progressively wash a limited transverse portion 15 of the vehicle 12 that is located in the portal 30. The limited transverse portion 15 of the vehicle is formed of a limited portion $15_{L1}$ of the first lateral side 14 of the vehicle 12, a limited portion $15_{L2}$ of the second lateral side 16 of the vehicle 12, and a limited portion $15_T$ of the top side 22 of the vehicle 12. These limited portions $15_{L1}$, $15_{L2}$, $15_T$ are limited in that their longitudinal extent is much less than a length of the vehicle 12 (measured along the longitudinal axis 11). While shown as being substantially perpendicular to the longitudinal axis 11 of the vehicle 12, in some cases, the limited transverse portion 15 of the vehicle 12 may be transverse to the longitudinal axis 11 without being perpendicular to it.

The control apparatus 34 and the nozzle 32 are operative to progressively wash the limited transverse portion 15 of the vehicle 12 by causing pressurized liquid to impinge on different parts of the limited transverse portion 15 at different instants, i.e., causing pressurized liquid to impinge on a first part of the limited transverse portion 15 while no pressurized liquid impinges on a second part of the limited transverse portion 15 and subsequently causing pressurized liquid to impinge on the second part of the limited transverse portion 15 while no pressurized liquid impinges on the first part of the limited transverse portion 15. In otherwords, pressurized liquid does not impinge simultaneously on an entirety of the limited transverse portion 15. In particular, in some embodiments, pressurized liquid impinges asynchronously (i.e., does not impinge simultaneously) on two (2) or three (3) of the first lateral side 14 of the vehicle 12, the second lateral side 16 of the vehicle 12, and the top side 22 of the vehicle 12.

More particularly, in this embodiment, the control apparatus 34 may cause the limited transverse portion 15 of the vehicle 12 to be progressively washed by controlling the nozzle 32 such that it first directs liquid on a lower region of the limited portion $15_{L1}$ of the first lateral side 14 and moves upwards along the portal 30 to direct liquid on gradually higher regions of the limited portion $15_{L1}$ of first lateral side 14, then moves transversally along the portal 30 to direct liquid on the limited portion $15_T$ of the top side 22 starting from the first lateral side 14 until reaching the second lateral side 16, and directs liquid on an upper region of the limited portion $15_{L2}$ of the second lateral side 16 and moves downwards along the portal 30 to direct liquid on gradually lower regions of the limited portion $15_{L2}$ of the second lateral side 16.

A user may use the washing apparatus 10 to wash the vehicle 12 by initially positioning an end portion of the vehicle 12, from either the front side 18 or the rear side 20 of the vehicle, in the portal 30. Upon being activated, the control apparatus 34 interacts with the nozzle 32 to progressively wash a first limited transverse portion 15 of the vehicle 12 that is located in the portal 30, i.e., the end portion of the vehicle 12 that has been positioned in the portal 30, as described above. The user may then move the vehicle 12 by a distance generally corresponding to a width of the first limited transverse portion 15 (measured along the longitudinal axis 11 of the vehicle 12) such that a second limited transverse portion 15 of the vehicle 12, which is now located in the portal 30, can be washed by the washing apparatus 10. Repeating this process, the user may use the washing apparatus 10 to wash the vehicle 12 via a sequence of immobilizations and movements of the vehicle 12 such that the washing apparatus 10 progressively washes a different limited transverse portion 15 of the vehicle 12 during each immobilization.

The washing apparatus 10 can thus wash the vehicle 12 by progressively washing each of a series of limited transverse portions 15 of the vehicle 12 that are adjacent to (and possibly overlap) one another. This progressive and sequential washing process may be particularly useful in residential and other settings where resources such as liquid flow and pressure, power, and space are limited.

With continued reference to FIG. 1, the portal 30 is configured to allow passage of the vehicle 12 therethrough and to support the nozzle 32. In this embodiment, the portal 30 comprises a frame 40 having a generally inverted U-shape. The frame 40 includes a plurality of frame members that define a channel 42 and that are supported by base plates $44_1$, $44_2$, which may be fixed on a floor (e.g., via bolts or other fasteners).

A pulley arrangement 46 is disposed in the channel 42 to move the nozzle 32 under action of the control apparatus 34, as further discussed later on. The pulley arrangement 46 comprises a first pulley wheel 47 mounted to the frame 40 adjacent to the base plate $44_1$, a second pulley wheel (not shown) mounted to the frame 40 adjacent to the based plate $44_2$, and a cable 49 or other elongated element (e.g., a chain, rope or belt) driven by these pulley wheels.

The nozzle 32 is linked to a carriage 50 that is coupled to the cable 49 such that, as the cable 49 of the pulley arrangement 46 is driven, the carriage 50 moves along the portal 30 carrying the nozzle 32 with it. The carriage 50 is provided with a conduit 52 leading to the nozzle 32 and in liquid communication with a source of pressurized liquid, which is further discussed later on. In this embodiment, liquid can flow to the conduit 52 and then to the nozzle 32 via a hose 56 that is arranged on a reel 58. As the carriage 50 moves along the portal 30 in one direction, the hose 56 unwinds from the reel 58 and, as the carriage moves along the portal 30 in the opposite direction, the hose 56 winds on the reel 58, in this case assisted by a spring-loaded rewind element 60.

In this embodiment, the conduit 52 is angled to position the nozzle 32 at an angle relative to a plane defined by the frame 40. Also, the conduit 52 is in contact with a surface of the frame 40 such that, as the carriage 50 moves along the portal 30 under action of the pulley arrangement 46, the conduit 52 rolls on the surface of the frame 40, thereby rotating the nozzle 32. In order to allow rotation of the conduit 52 and the nozzle 32, the conduit 52 is coupled to the hose 56 via a rotatable coupling 54 (e.g., a swivel joint). The rotation and the angle of the nozzle 32 allows liquid directed from the nozzle 32 to wash a greater limited transverse portion 15 of the vehicle 12. In addition, by virtue of its rotation and angle, the nozzle 32 can be oriented toward the front side 18 and the rear side 20 of the vehicle 12 so as to allow at least part of the front side 18 and the rear side 20 to be washed.

The source of pressurized liquid may take on many different forms in various embodiments. For example, in this embodiment, the source of pressurized liquid is a pressure washer 41. The pressure washer 41 may be a commercially-available pressure washer (i.e., electric- or gas-powered pressure washer), which may be supplied with the washing apparatus 10 or obtained separately. The pressure washer 41 includes a low-pressure inlet 38 through which water at a relatively low pressure may enter, pressurizing components (e.g., a motor and a pump), and a high-pressure outlet 39 through which water (possibly with one or more additives) at a relatively high pressure may exit. This pressurized liquid exiting the pressure washer 41 can flow to the nozzle 32 via a hose 57 in liquid communication with the hose 56 arranged on the reel 58 via a rotatable coupling. In other embodiments, the washing apparatus 10 may comprise pressurizing equipment (e.g., a pump and motor) integrated with the washing apparatus 10 and serving as the source of pressurized liquid.

The control apparatus 34 is operative to control components of the washing apparatus 10. In this embodiment, the control apparatus 34 comprises a control unit 64 and a motor 66 coupled to the control unit 64. The control unit 64 implements control functionality of the washing apparatus 10. To that end, the control unit 64 comprises suitable circuitry, electrical and/or electronic components, hardware, and/or software for implementing its functionality and may be powered via an electrical connector 59 connectable to a conventional power outlet.

More particularly, the control unit 64 controls the motor 66 to cause motion of the nozzle 32 along the portal 30. The motor 66 is mounted to the frame 40 and connected to the pulley arrangement 46. Specifically, in this case, the motor 66 is connected to the first pulley wheel 47 via a shaft in order to drive the first pulley wheel 47. The control unit 64 is operative to send signals to the motor 66 to cause it to drive the pulley arrangement 46 so as to move the carriage 50 and the nozzle 32 along the portal 30 in either direction.

The control unit 64 also controls flow of liquid from the pressure washer 41 to the nozzle 32. To that end, in this embodiment, the control unit 64 is provided with an electrical connector 61 having a male part and a female part. The male part of the electrical connector 61 is connectable to a conventional power outlet, while the female part of the electrical connector 61 is connectable to an electrical connector of the pressure washer 41. The control unit 64 is adapted to selectively apply power to the female part of the electrical connector 61, thereby controlling power applied to the pressure washer 41 and thus flow of liquid from the pressure washer 41 to the nozzle 32.

The pressure washer 41 may comprise an additive injector adjacent to its low-pressure inlet 38 or its high-pressure outlet 39 to inject one or more additives (e.g., detergent, wax, and/or other cleaning and/or treatment agents) into pressurized water flowing out of the pressure washer 41. Each additive may be contained in a container 53 of the pressure washer 41 and supplied to the additive injector via a hose 55. A tee coupling 63 may be provided for connection to the high-pressure outlet 39 of the pressure washer 41 to enable the pressure washer 41 to be connected to the washing apparatus 10 and still be able to connect a spray gun to the pressure washer 41, which may be used while not sending pressurized liquid to the nozzle 32.

The washing apparatus 10 may also be provided with one or more containers 19 containing one or more additives for injection into liquid flowing to the nozzle 32 under control of the control unit 64. One or more valves 51 (e.g., single- or multiple-way valves) may be controlled by the control unit 64 to select one or more additives to be injected into liquid flowing to the nozzle 32 via a tube 67. In this case, the tube 67 may be coupled to the hose 55 of the pressure washer 41 instead of the container 53 to allow injection of one or more additives contained in the one or more containers 19.

In some embodiments where the additive injector of the pressure washer 41 may operate to inject one or more additives into liquid flowing out of the pressure washer 41 when less restriction is present at the high-pressure outlet 39 of the pressure washer 41, the control apparatus 34 may comprise an actuator (not shown) for controlling an opening of the nozzle 32 in order to trigger injection of the one or more additives by the additive injector. In these embodiments, the actuator may be coupled to the control unit 64 via a wired or wireless link.

The control apparatus 34 implements a user interface enabling a user to input information (e.g., enter commands, select options, etc.) and possibly obtain information (e.g., view a selected wash cycle) pertaining to operation of the washing apparatus 10. For example, in this embodiment, the user interface comprises controls 68 (e.g., buttons) of the control unit 64 and a remote control device 70 for use at a distance. The controls 68 of the control unit 64 may enable the user to activate and deactivate the washing apparatus 10, select a particular wash cycle, control movement of the nozzle 32 along the portal 30, control flow of liquid from the nozzle 32, command injection of one or more additives, and/or control other aspects of the washing apparatus 10. Similarly, the remote control device 70, which may wirelessly communicate with a wireless interface 71 (e.g., an RF, infrared or other interface) of the control unit 64, may enable the user to remotely activate and deactivate the washing apparatus 10, select a particular wash cycle, control movement of the nozzle 32 along the portal 30, control flow of liquid from the nozzle 32, command injection of one or more additives, and/or control other aspects of the washing apparatus 10. This may be particularly useful as it can allow the user to control the washing apparatus 10 from inside the vehicle 12.

In some embodiments, the user interface of the control apparatus 34 may comprise only the controls 68 of the control unit 64 or only the remote control device 70. Generally, the user interface of the control apparatus 34 may comprise any component (e.g., a keyboard, a display, a touchscreen, a microphone, a speaker, etc.) that enables the user to input information pertaining to operation of the washing apparatus 10 and possibly obtain information pertaining to operation of the washing apparatus 10. Furthermore, in addition to input from the user, the control unit 64 may receive signals from one or more sensors (not shown), such as limit switches or proximity sensors, conveying information pertaining to operation of the washing apparatus 10.

It will thus be appreciated that a user may use the washing apparatus 10 to wash the vehicle 12 by initially positioning an end portion of the vehicle 12, from either the front side 18 or the rear side 20 of the vehicle, in the portal 30. Upon being activated, the control apparatus 34 causes a limited transverse portion 15 of the vehicle 12 located in the portal 30 to be progressively washed by controlling the nozzle 32 such that it first directs liquid on a lower region of a limited portion $15_{L1}$ of the first lateral side 14 of the vehicle 12 and moves upwards along the portal 30 to direct liquid on gradually higher regions of the limited portion $15_{L1}$ of the first lateral side 14 of the vehicle 12, then moves transversally along the portal 30 to direct liquid on a limited portion $15_T$ of the top side 22 of the vehicle 12 starting from the first lateral side 14 of the vehicle 12 until reaching the second lateral side 16 of the vehicle 12, and directs liquid on an upper region of a limited portion $15_{L2}$ of the second lateral side 16 of the vehicle 12 and moves downwards along the portal 30 to direct liquid on gradually lower regions of the limited portion $15_{L2}$ of the second lateral side 16 of the vehicle 12. In some cases, this process can be repeated with the nozzle 32 moving in the opposite direction along the portal 30 to more thoroughly wash the limited transverse portion 15 of the vehicle 12 located in the portal 30. Also, liquid directed from the nozzle 32 may be water or water with one or more additives, depending on whether one or more additives have been injected by the control apparatus 34.

As the limited transverse portion 15 of the vehicle 12 is progressively washed, pressurized liquid flowing out of the nozzle 32 impinges at different times on the limited portion 15$_{L1}$ of the first lateral side 14 of the vehicle 12, the limited portion 15$_{L2}$ of the second lateral side 16 of the vehicle 12, and the limited portion 15$_T$ of the top side 22 of the vehicle 12. More particularly, in this case: when liquid impinges on the limited portion 15$_{L1}$ of the first lateral side 14 of the vehicle 12, no liquid impinges on the limited portion 15$_{L2}$ of the second lateral side 16 of the vehicle 12 and no liquid impinges on the limited portion 15$_T$ of the top side 22 of the vehicle 12; when liquid impinges on the limited portion 15$_T$ of the top side 22 of the vehicle 12, no liquid impinges on the limited portion 15$_{L1}$ of the first lateral side 14 of the vehicle 12 and no liquid impinges on the limited portion 15$_{L2}$ of the second lateral side 16 of the vehicle 12; and when liquid impinges on the limited portion 15$_{L2}$ of the second lateral side 16 of the vehicle 12, no liquid impinges on the limited portion 15$_{L1}$ of the first lateral side 14 of the vehicle 12 and no liquid impinges on the limited portion 15$_T$ of the top side 22 of the vehicle 12. Thus, in this embodiment, pressurized liquid impinges asynchronously (i.e., does not impinge simultaneously) on the first lateral side 14 of the vehicle 12, the second lateral side 16 of the vehicle 12, and the top side 22 of the vehicle 12. In other words, liquid impinges on the limited portion 15$_{L1}$ of the first lateral side 14 of the vehicle 12 during a first period of time, on the limited portion 15$_{L2}$ of the second lateral side 16 of the vehicle 12 during a second period of time, and on the limited portion 15$_T$ of the top side 22 of the vehicle 12 during a third period of time, where the first period of time, the second period of time and the third period of time are non-concurrent. Since it does not direct liquid on all sides of the vehicle 12 simultaneously, this progressive washing process focuses available liquid flow and pressure resources on a relatively small area of the vehicle 12 at any given moment. In residential or other settings where such resources are limited, the washing apparatus 10 can thus be particularly useful to achieve a desired cleaning efficiency.

When the limited transverse portion 15 of the vehicle 12 located in the portal 30 has been washed, the user may move the vehicle 12 by a distance generally corresponding to a width of this limited transverse portion 15 (measured along the longitudinal axis 11 of the vehicle 12) such that another limited transverse portion 15 of the vehicle 12, which is now located in the portal 30, can be washed by the washing apparatus 10, as described above. Repeating this process, the user may use the washing apparatus 10 to wash the vehicle 12 via a sequence of immobilizations and movements of the vehicle 12 such that the washing apparatus 10 progressively washes a different limited transverse portion 15 of the vehicle 12 during each immobilization.

The washing apparatus 10 can thus wash the vehicle 12 by progressively washing each of a series of limited transverse portions 15 of the vehicle 12 that are adjacent to (and possibly overlap) one another. This progressive and sequential washing process may be particularly useful in residential and other settings where resources such as liquid flow and pressure, power, and space are limited.

For instance, when installed at home, the washing apparatus 10 is convenient and provides several benefits to a user of the vehicle 12. Indeed, the washing apparatus 10 can save significant time for the user who would otherwise have to either manually wash the vehicle 12 or go to a remote car wash facility and wait in line before getting the vehicle 12 cleaned. This convenience and ease with which the vehicle 12 can be cleaned promotes more frequent cleaning of the vehicle 12, which is not only aesthetically beneficial but also helps to fend off corrosion and other deterioration effects. More frequent cleaning of the vehicle 12 can also be practical and safe as it keeps the vehicle's windows clean and clear, which can be particularly beneficial in cold climate regions where abrasives are used to clear roads.

It will be recognized that various modifications and enhancements may be made to the washing apparatus 10 in other embodiments. For instance, FIGS. 3A to 3C and 4 to 11 illustrate examples of such modifications and enhancements.

Figure 3A:
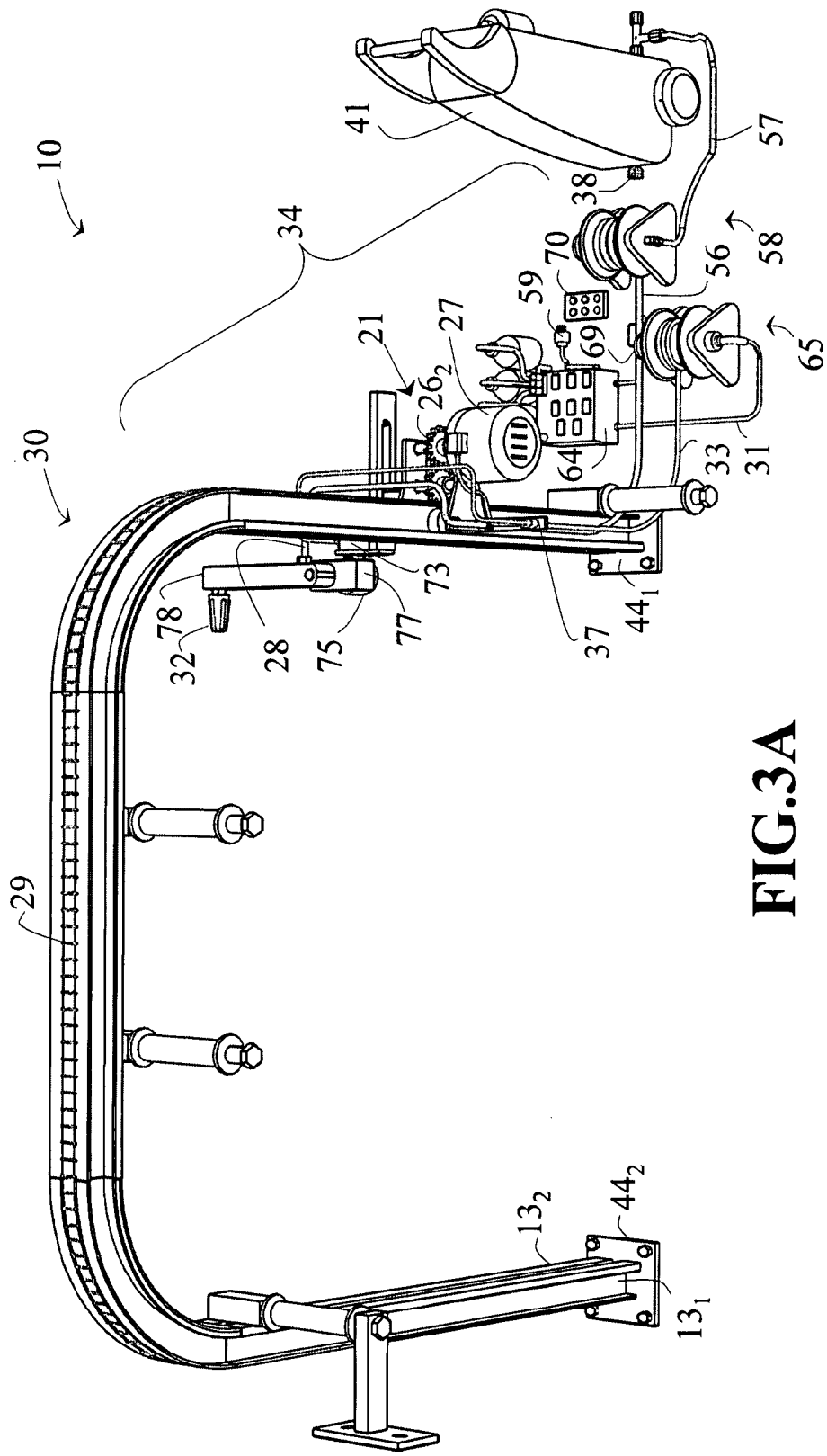
FIGS. 3A and 3B show an apparatus for washing a vehicle in accordance with a second embodiment of the invention.
Figure 3B:
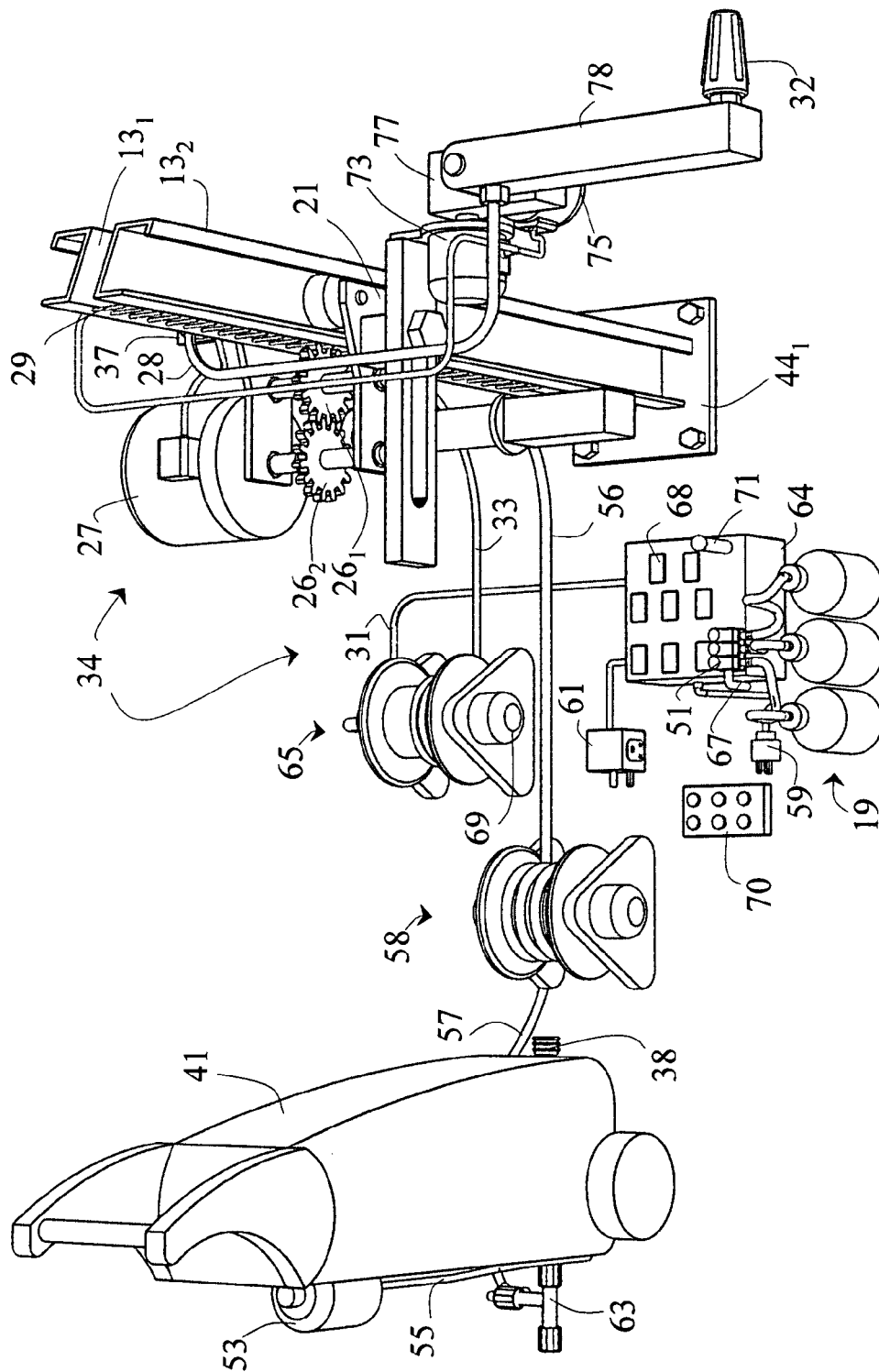

FIGS. 3A and 3B show a second embodiment of the washing apparatus 10. In this embodiment, the portal 30 comprises frame members 13$_1$, 13$_2$ between which is mounted a series of rollers 29. The portal 30 also comprises a carriage 21 including a first gear 26$_1$ engaging the rollers 29 and a second gear 26$_2$ mounted on a shaft associated with a motor 27 of the control apparatus 34, thereby enabling the carriage 21 to move along the portal 30 under action of the motor 27. The carriage 21 also comprises a member 37 serving to interconnect the hose 56 arranged on the reel 58 with a flexible hose 28 leading to the nozzle 32. The member 37 also serves to interconnect wiring in an electric cable 33, wound on a reel 65, to wiring of electrical components moving with the carriage 21 along the portal 30. More particularly, wiring in the electric cable 33 are connected to wiring supplying power to the motor 27, a motor 73, and a motor 75 of the control apparatus 34. An electric cable 31 connected to the control unit 64 contains wiring required for power and controls to all electrical components moving along the portal 30 and connects to a slip ring of the reel 65 to which is also connected the electric cable 33. The electric cable 33 unwinds from the reel 65 when the carriage 21 moves along the portal 30 in one direction and rewinds on the reel 65 when the carriage 21 moves along the portal 30 in the opposite direction, assisted by a spring rewind unit 69 on its way back.

A member 77 is fixed on a shaft associated with the motor 73 and has the motor 75 fixed to it. When the motor 73 rotates the shaft associated therewith, it rotates the member 77 and the nozzle 32 which is coupled thereto via a manifold 78. Rotation of the nozzle 32 under action of the motor 73 in between movements of the carriage 21 along the portal 30 enables the nozzle 32 to wash a different limited transverse portion 15 of the vehicle 12 without requiring movement of the vehicle 12 relative to the portal 30. The nozzle 32 may also be alternately rotated clockwise and counterclockwise while the carriage 21 moves along the portal 30 to wash a greater limited transverse portion 15 of the vehicle 12. In some embodiments, the nozzle 32 may also be continuously rotated while the carriage 21 moves along the portal 30 to wash a greater limited transverse portion 15 of the vehicle 12, in which case the flexible hose 28 may be connected to the manifold 78 via a rotatable coupling (e.g., a swivel joint).

The motor 75 rotates the manifold 78 and the nozzle 32 in a different plane than the motor 73 does. Through rotation of the manifold 78 under action of the motor 75 and/or the motor 73, the nozzle 32 may be positioned to direct liquid toward the front side 18 or the rear side 20 of the vehicle 12 in order to wash that side.

Figure 3C:
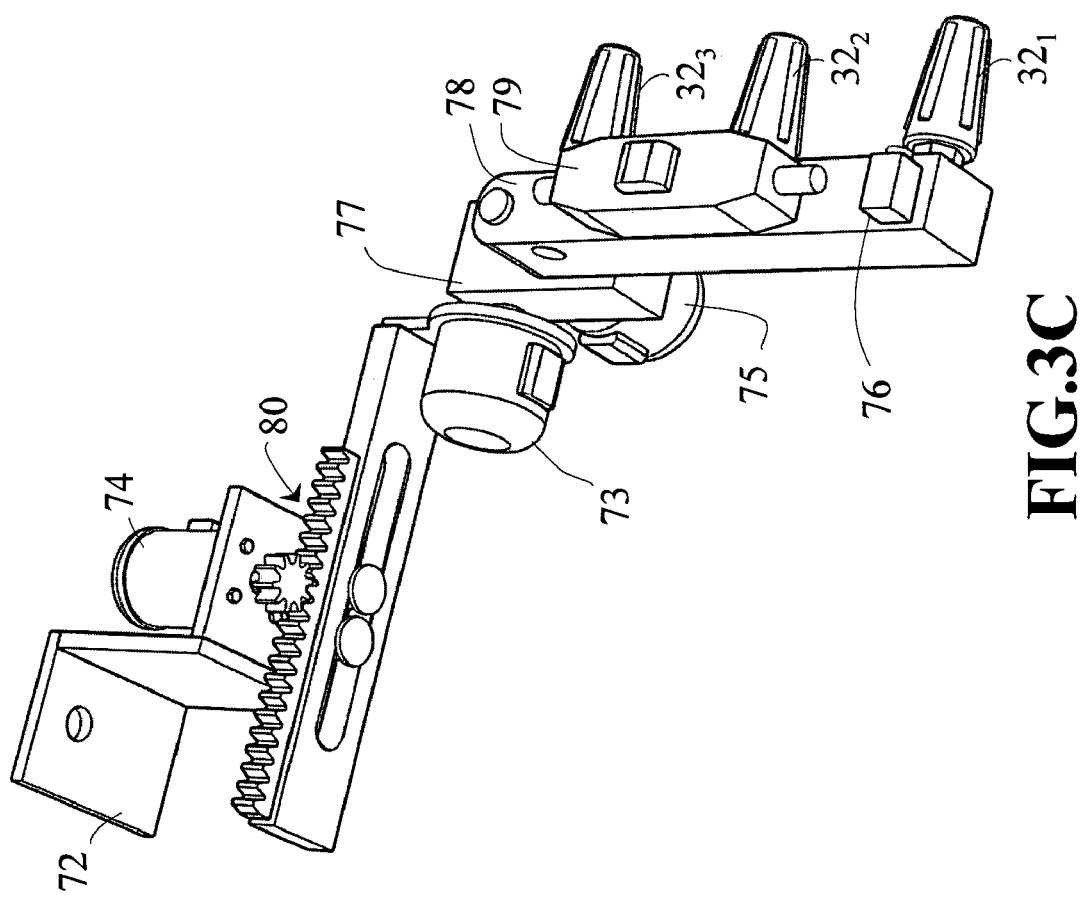
FIG. 3C shows a variant of the second embodiment shown in FIGS. 3A and 3B.

FIG. 3C illustrates a variant assembly which may be provided in to the carriage 21. In this variant, a plurality of nozzles 32$_1$ ... 32$_3$ (in this case, three (3)) are coupled to the manifold 78. A solenoid valve 79 is mounted on the manifold 78 and is responsive to electric signals from the control unit 64 to control which one(s) of the nozzles 32$_1$ ... 32$_3$ direct(s) liquid toward the vehicle 12. Also, in this variant, a motor 74 fixed to a bracket 72 may be electrically controlled by the control unit 64 to cause movement of the nozzles $32_1 \ldots 32_3$ toward or away from a surface of the vehicle 12 to be washed via a rack and pinion linkage 80. A proximity sensor 76 may be mounted on the manifold 78 to send to the control unit 64 a signal indicative of a distance between itself and a surface it faces, thereby enabling the control unit 64 to electrically control the motor 74 to position the nozzles $32_1 \ldots 32_3$ accordingly. As a possible alternative or addition to the proximity sensor 76, a series of proximity sensors may be distributed along the portal 30 to sense a distance between the portal 30 and surfaces of the vehicle 12.

Figure 4:
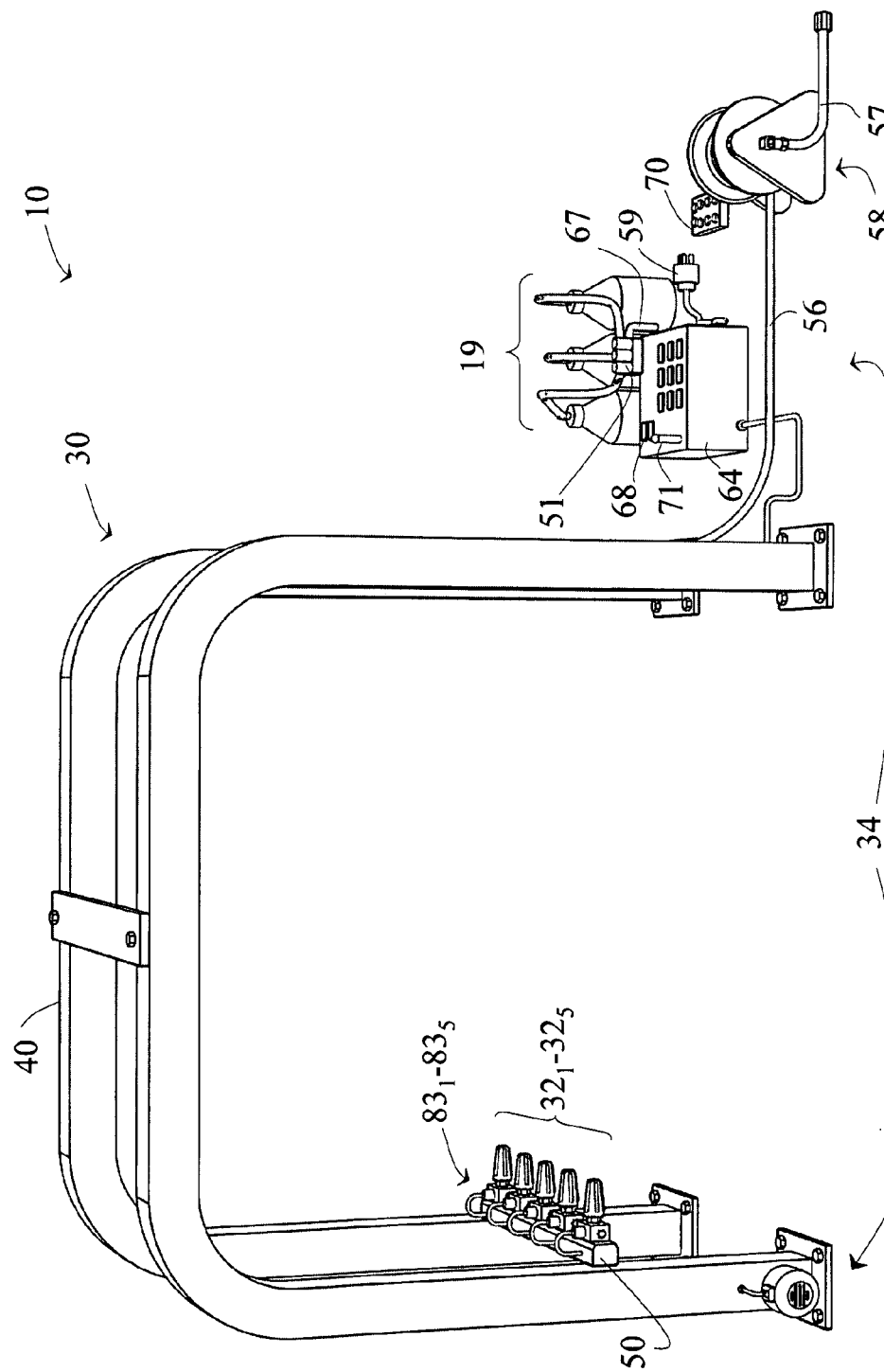
FIG. 4 shows an apparatus for washing a vehicle in accordance with a third embodiment of the invention.

FIG. 4 shows a third embodiment of the washing apparatus 10. In this embodiment, the frame 40 of the portal 30 comprises a double arrangement of frame members. The carriage 50, which can move along this double arrangement of frame members, supports a plurality of nozzles $32_1 \ldots 32_5$ (in this case, five (5)). Solenoid valves $83_1 \ldots 83_5$ associated with the nozzles $32_1 \ldots 32_5$ can be electrically controlled by the control unit 64 to control which one(s) of the nozzles $32_1 \ldots 32_5$ direct(s) liquid toward the vehicle 12. An electric cable reel, an electric cable hanger system on a guide, a system of bus bars with contacts attached on the carriage 50, or any other suitable means may be used to bring electricity to the solenoid valves $83_1 \ldots 83_5$.

Additives in this embodiment may be added with an additives injector which may be provided with the pressure washer 41 or with a separate injector system supplied with the washing apparatus 10. One or more of the nozzles $32_1 \ldots 32_5$ may be dedicated to spraying one or more additives. Also, in some cases, activation of all the solenoid valves $83_1 \ldots 83_5$ may also reduce the pressure enough at the high-pressure outlet of the pressure washer 41 to allow injection of additives through the additives injector.

Figure 5:
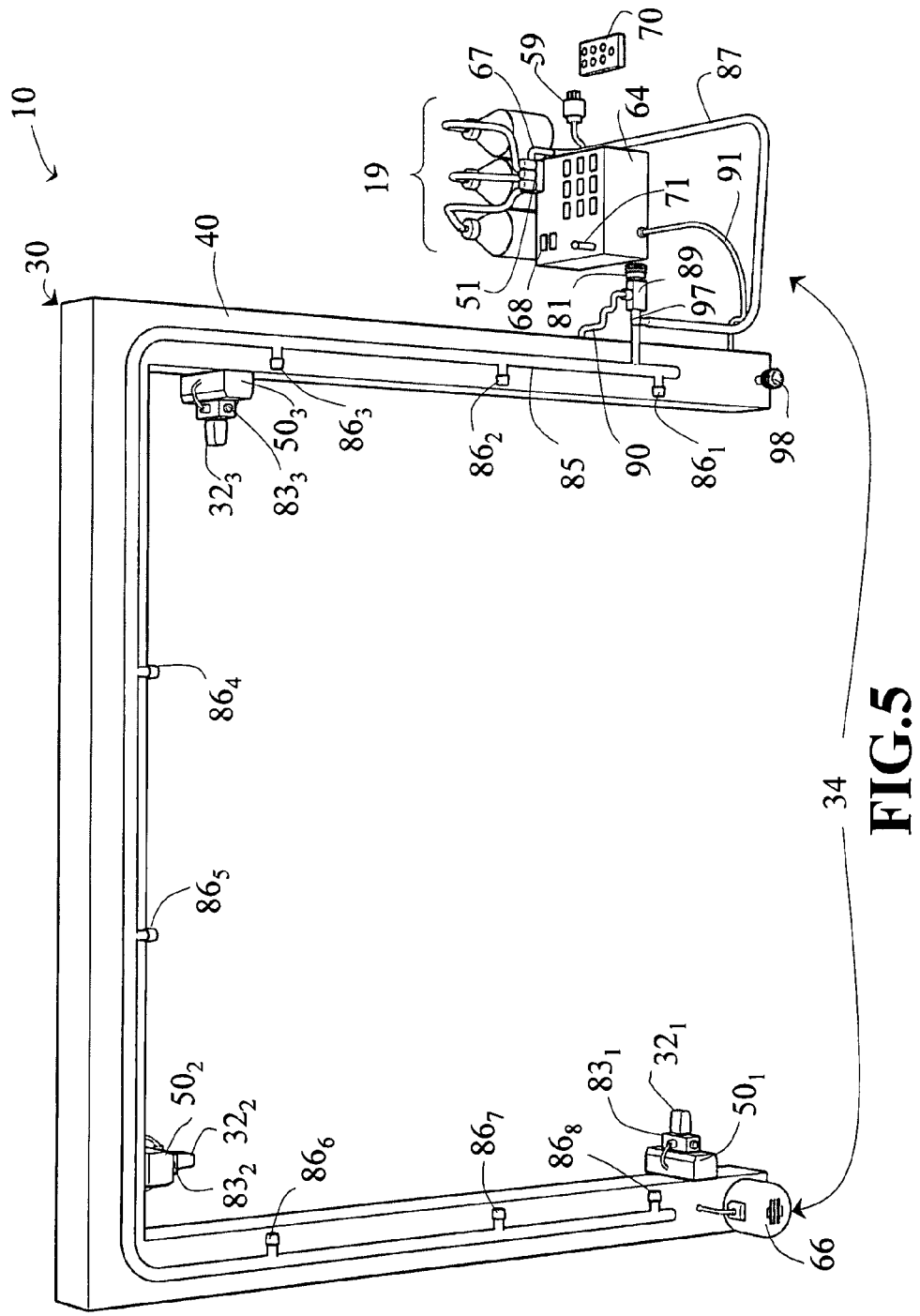
FIG. 5 shows an apparatus for washing a vehicle in accordance with a fourth embodiment of the invention.

FIG. 5 shows a fourth embodiment of the washing apparatus 10. In this embodiment, a plurality of carriages $50_1 \ldots 50_3$ (in this case, three (3)) carrying nozzles $32_1 \ldots 32_3$ can move along differently-oriented portions of the portal 30 under action of the motor 66. In this case, the carriage $50_1$ carrying the nozzle $32_1$ can move along a first vertical portion of the portal 30, the carriage $50_2$ carrying the nozzle $32_2$ can move along a horizontal portion of the portal 30, and the carriage $50_3$ carrying the nozzle $32_3$ can move along a second vertical portion of the portal 30. While in this embodiment the motor 66 causes simultaneous motion of the carriages $50_1 \ldots 50_3$, in other embodiments, other motors may be provided to cause independent motion of one or more of the carriages $50_1 \ldots 50_3$.

Also, in this embodiment, the carriages $50_1 \ldots 50_3$ carry respective solenoid valves $83_1 \ldots 83_3$ associated with the nozzles $32_1 \ldots 32_3$ and electrically controllable by the control unit 64 to control which one(s) of the nozzles $32_1 \ldots 32_3$ direct(s) liquid toward the vehicle 12.

In addition, in this embodiment, a coupling 98 is connectable to a source of high-pressure water or other liquid. The coupling 98 leads to a main tube (not shown) mounted on the frame 40 of the portal 30, which is configured to deliver the high-pressure water or other liquid to each of the nozzles $32_1 \ldots 32_3$.

Furthermore, in this embodiment, one or more additives contained in the one or more containers 19 may be sprayed on the vehicle 12 via a dedicated additives spraying system. More particularly, in this embodiment, the dedicated additives spraying system comprises a spraying tube 85 mounted on the frame 40 of the portal 30 and connected to a plurality of spraying nozzles $86_1 \ldots 86_8$ (in this case, eight (8)) for spraying one or more additives contained in the one or more containers 19. The control unit 64 may cause the one or more valves 51 to allow one or more additives contained in the one or more containers 19 to be delivered via the tube 67 and a hose 87 coupled to the tube 67 and an injector 97 located after a solenoid valve 89 powered through a cable 90. A coupling 81 allows low-pressure water or other liquid to pass therethrough and mix with one or more additives from the one or more containers 19 injected by the injector 97, and then sprayed via the spraying tube 85 and one or more of the spraying nozzles $86_1 \ldots 86_8$.

An electric cable 91 connected to the control unit 64 can deliver electric power and control signals to electrical components, such as the solenoid valves $83_1 \ldots 83_3$, mounted in the portal 30.

Figure 6:
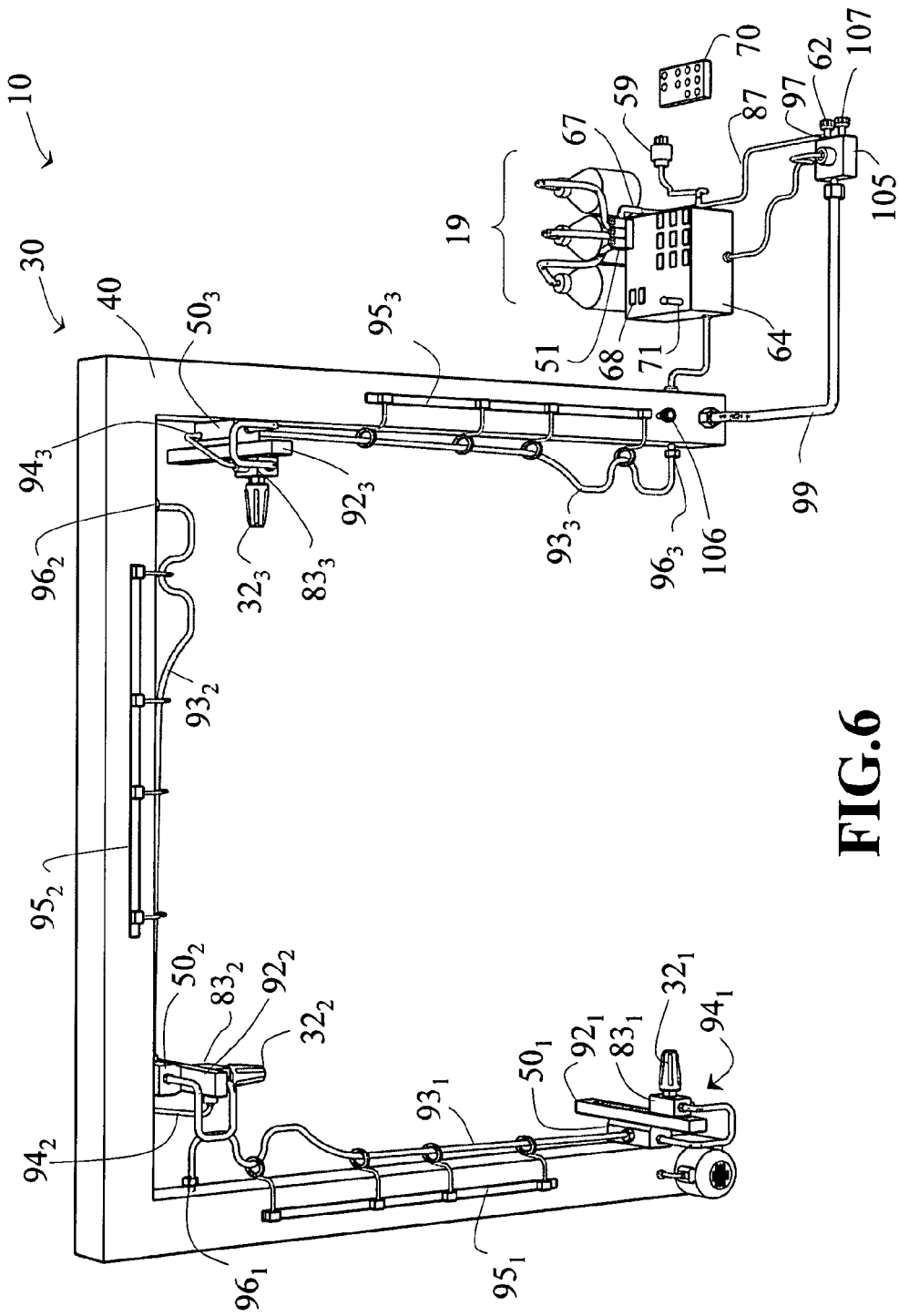
FIG. 6 shows an apparatus for washing a vehicle in accordance with a fifth embodiment of the invention.

FIG. 6 shows a fifth embodiment of the washing apparatus 10. In this embodiment, the carriages $50_1 \ldots 50_3$ carry side-shifting mechanisms $92_1 \ldots 92_3$ operable to move the nozzles $32_1 \ldots 32_3$ in a direction transverse to a direction of movement of the carriages $50_1 \ldots 50_3$ along the portal 30, and thus in a direction substantially parallel to the longitudinal axis 11 of the vehicle 12. This allows limited transverse portions 15 of the vehicle 12 having a greater extent to be washed. The side-shifting mechanisms $92_1 \ldots 92_3$ may be controlled by the control unit 64, electrically, hydraulically or otherwise. Hoses $93_1 \ldots 93_3$ supply liquid to the nozzles $32_1 \ldots 32_3$ through solenoid valves $83_1 \ldots 83_3$, which receive power from cables $94_1 \ldots 94_3$. The hoses $93_1 \ldots 93_3$, which are guided by guiding elements $95_1 \ldots 95_3$, connect to couplings $96_1 \ldots 96_3$ linked to the main tube (not shown) mounted to the frame 40 of the portal 30.

Also, in this embodiment, a coupling 107 is connectable to a source of high-pressure water or other liquid, which can be delivered to the nozzles $32_1 \ldots 32_3$ via a tube 99 linked to the main tube (not shown) in the portal 30 and the hoses $93_1 \ldots 93_3$.

In addition, in this embodiment, the control unit 64 may cause one or more additives contained in the one or more containers 19 to be delivered via the tube 67, the hose 87 coupled to the tube 67, and an injector 97 by controlling a solenoid valve 105 so as to allow passage of low-pressure liquid through a coupling 62 connected to the tube 99 and connectable to a source of low-pressure liquid. A coupling 106 in liquid communication with a main tube (not shown) allows a spray gun to be connected to the source of pressurized liquid or low-pressure liquid when the washing apparatus 10 is not functioning.

Figure 7:
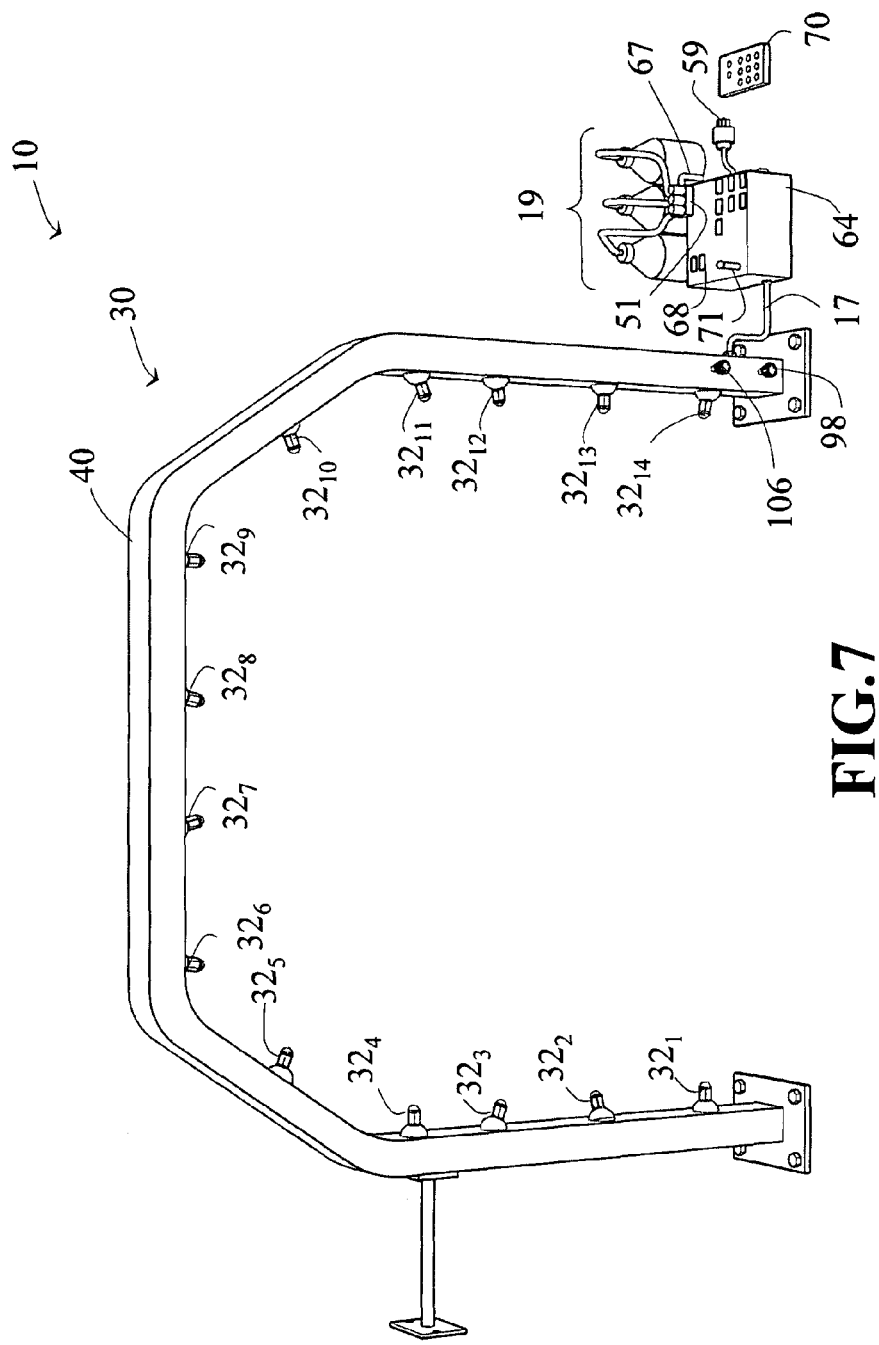
FIG. 7 shows an apparatus for washing a vehicle in accordance with a sixth embodiment of the invention.

FIG. 7 shows a sixth embodiment of the washing apparatus 10. In this embodiment, a series of nozzles $32_1 \ldots 32_{14}$ (in this case, fourteen (14)) are distributed along the portal 30 and fixed in relation thereto so as to progressively wash a limited transverse portion 15 of the vehicle 12, without moving along the portal 30. Solenoid valves (not shown) respectively associated with the nozzles $32_1 \ldots 32_{14}$ are electrically controllable by the control unit 64 to control which one(s) of the nozzles $32_1 \ldots 32_{14}$ direct(s) liquid toward the vehicle 12 at any given time. The control unit 64 may control the nozzles $32_1 \ldots 32_{14}$ by sending control signals to the solenoid valves via wires in a cable 17. A sequence of activation of the nozzles $32_1 \ldots 32_{14}$ (e.g., from the nozzle $32_1$ to the nozzle $32_{14}$ or vice versa, or from the nozzle $32_7$ to the nozzle $32_1$ and from the nozzle $32_8$ to the nozzle $32_{14}$), either individually or in group, is effected by the control unit 64 and may be selected by a user or predetermined (e.g., preprogrammed or factory set). In this embodiment, the coupling 98 is connectable to a source of high-pressure water or other liquid, which can be delivered to the nozzles $32_1 \ldots 32_{14}$ via a main tube (not shown) in the portal 30. Also, in this embodiment, the nozzles $32_1 \ldots 32_{14}$ are rotatable nozzles, thereby allowing a limited transverse portion 15 of the vehicle 12 having a greater extent to be washed. A coupling 106 in liquid communication with a main tube (not shown) allows a spray gun to be connected to the source of pressurized liquid or low-pressure liquid when the washing apparatus 10 is not functioning.

Figure 8:
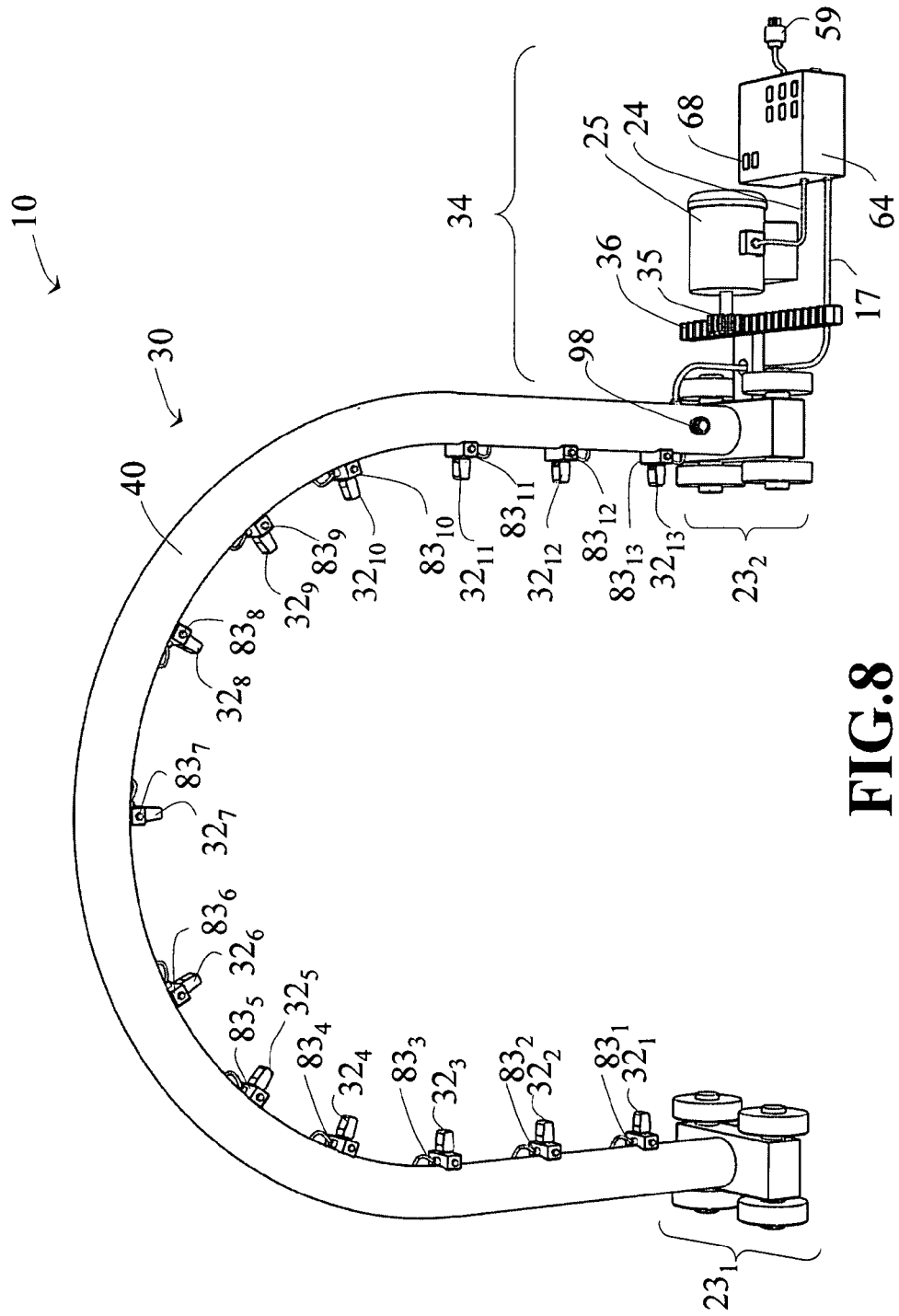
FIG. 8 shows an apparatus for washing a vehicle in accordance with a seventh embodiment of the invention.

FIG. 8 shows a seventh embodiment of the washing apparatus 10. In this embodiment, the washing apparatus 10 is configured such that the portal 30 is movable along a direction substantially parallel to the longitudinal axis 11 of the vehicle 12. More particularly, in this case, the frame 40 of the portal 30 is placed on a pair of bogies $23_1, 23_2$. An electrical cable 24 connected to the control unit 64 brings power and controls to a motor 25 adapted to rotate a gear 35 engaging a rack 36, resulting in longitudinal movement of the portal 30. For example, the longitudinal movement of the portal 30 may be a continuous back and forth movement or may have a pause between different limited transverse portions 15 of the vehicle 12. In this embodiment, the control unit 64 controls a plurality of nozzles $32_1 \ldots 32_{13}$ by sending control signals to a plurality of solenoid valves $83_1 \ldots 83_{13}$ via wires in the cable 17. Also, in this embodiment, the coupling 98 is connectable to a source of high-pressure water or other liquid, which can be delivered to the nozzles $32_1 \ldots 32_{13}$ via a main tube (not shown) in the portal 30.

Figure 9:
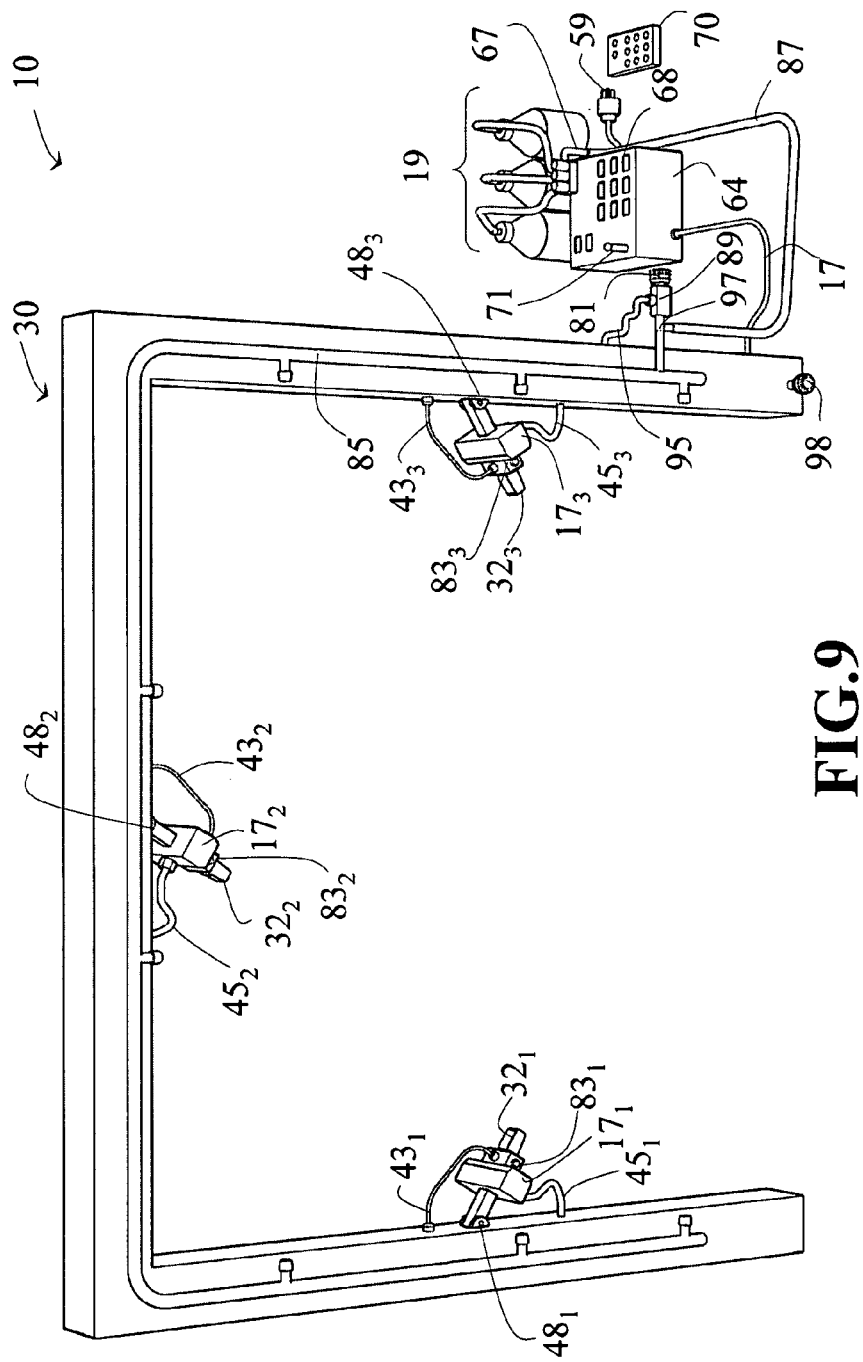
FIG. 9 shows an apparatus for washing a vehicle in accordance with an eighth embodiment of the invention.

FIG. 9 shows an eighth embodiment of the washing apparatus 10. In this embodiment, a plurality of nozzles $32_1 \ldots 32_3$ (in this case, three (3)) are associated with a plurality of solenoid valves $83_1 \ldots 83_3$ which can be controlled by the control unit 64 by sending signals via wires $43_1 \ldots 43_3$ in the cable 17. Liquid is delivered to the nozzles $32_1 \ldots 32_3$ via flexible hoses $45_1 \ldots 45_3$ connected to a main tube (not shown) in the portal 30. Also, in this embodiment, the nozzles $32_1 \ldots 32_3$ and the solenoid valves $83_1 \ldots 83_3$ are mounted on pivotable members $48_1 \ldots 48_3$ that can pivot relative to the frame 40 of the portal 30. The pivotable members $48_1 \ldots 48_3$ may be caused to pivot relative to the frame 40 of the portal 30 under action of pressurized liquid flowing out of the nozzles $32_1 \ldots 32_3$ or under action of actuators (not shown), which can be controlled by the control unit 64. In this embodiment, the coupling 98 is connectable to a source of high-pressure water or other liquid, which can be delivered to the nozzles $32_1 \ldots 32_3$ via a main tube (not shown) in the portal 30. In addition, in this embodiment, the control unit 64 may cause one or more additives contained in the one or more containers 19 to be delivered via the tube 67, the hose 87 coupled to the tube 67, and the injector 97 by controlling the valve 89 so as to allow passage of low-pressure liquid through the coupling 81 to the spraying tube 85. In this embodiment the nozzles $32_1 \ldots 32_3$ could be activated in any possible combination of the three (3) nozzles $32_1 \ldots 32_3$ (e.g., either $32_1$ or $32_2$ or $32_3$ one at a time, two of them together, or the three of them simultaneously).

Figure 10A:
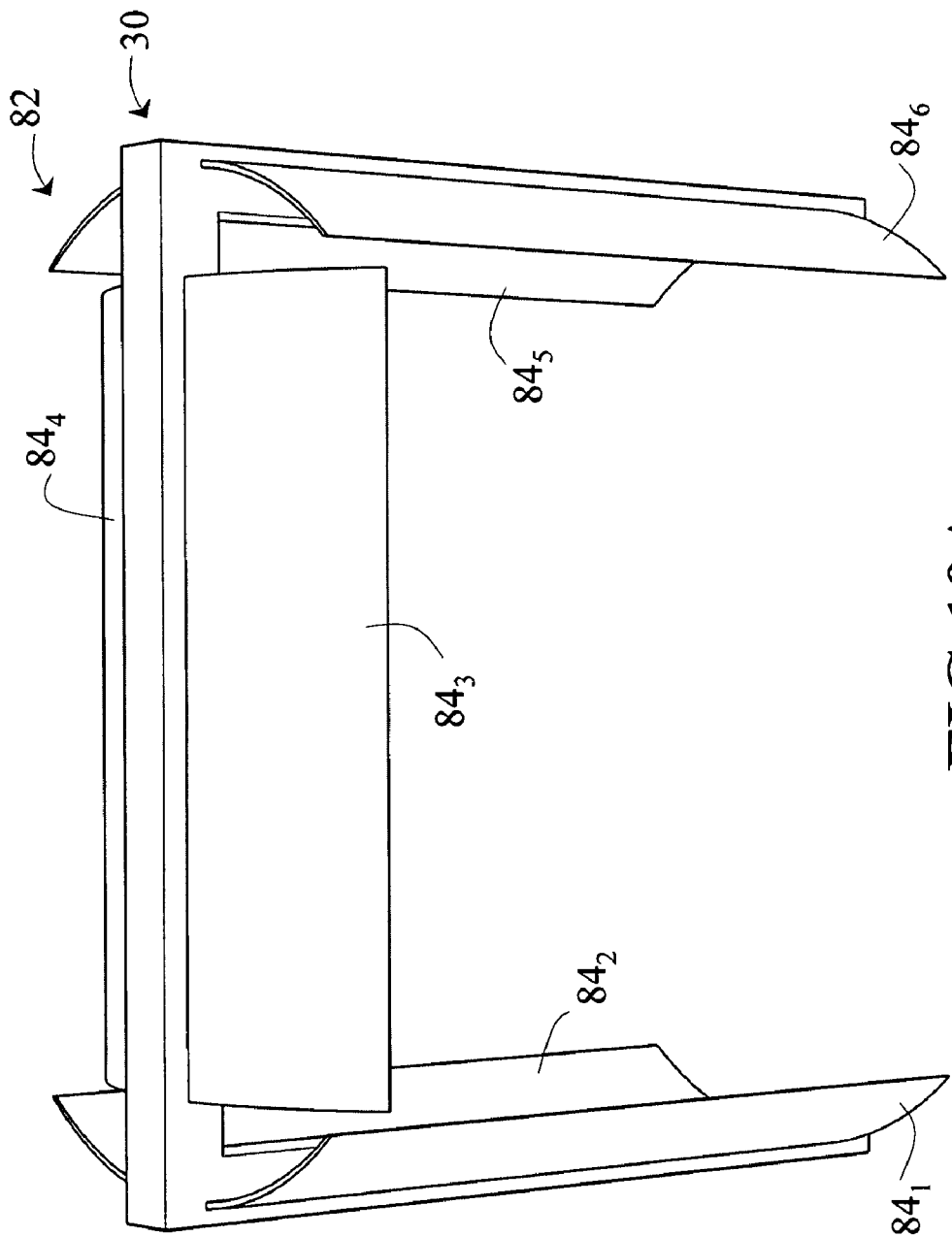
FIGS. 10A to 10C show examples of splash covers provided in accordance with certain embodiments of the invention.
Figure 10B:
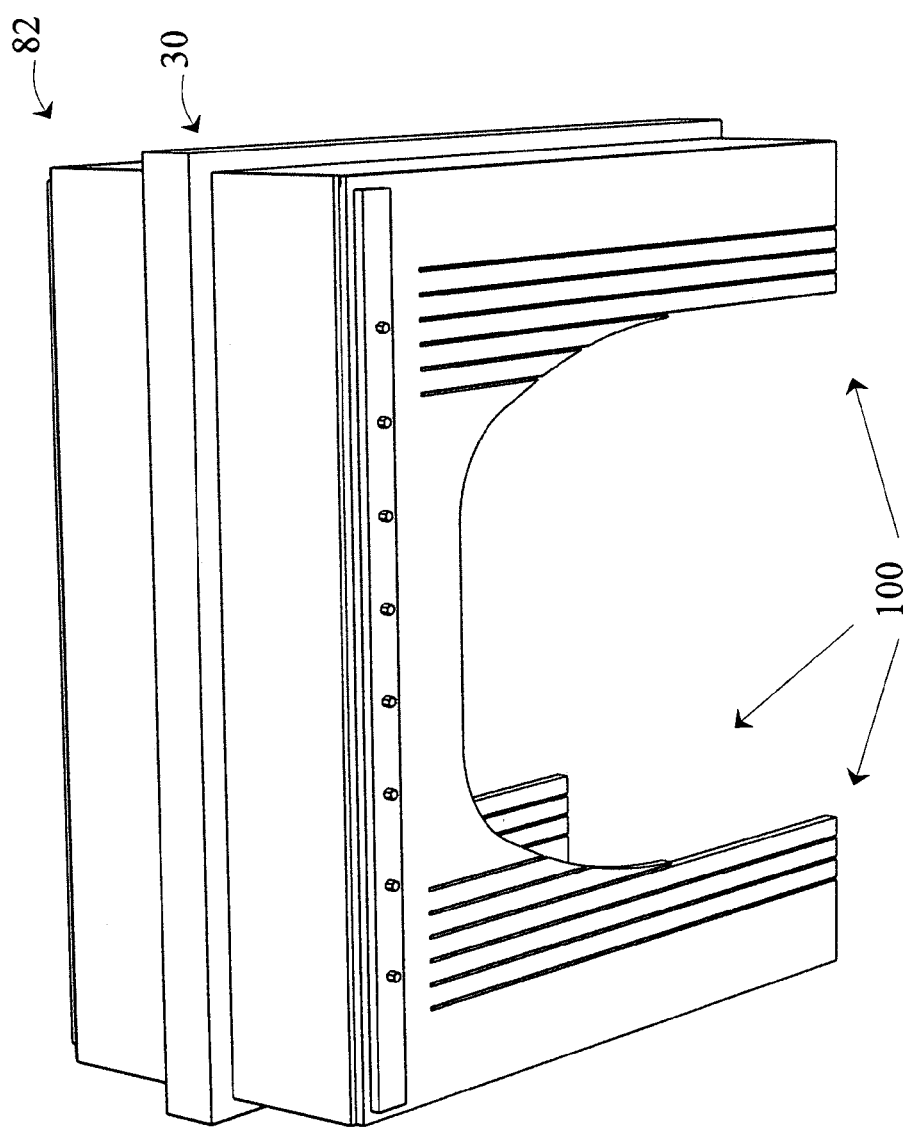
Figure 10C:
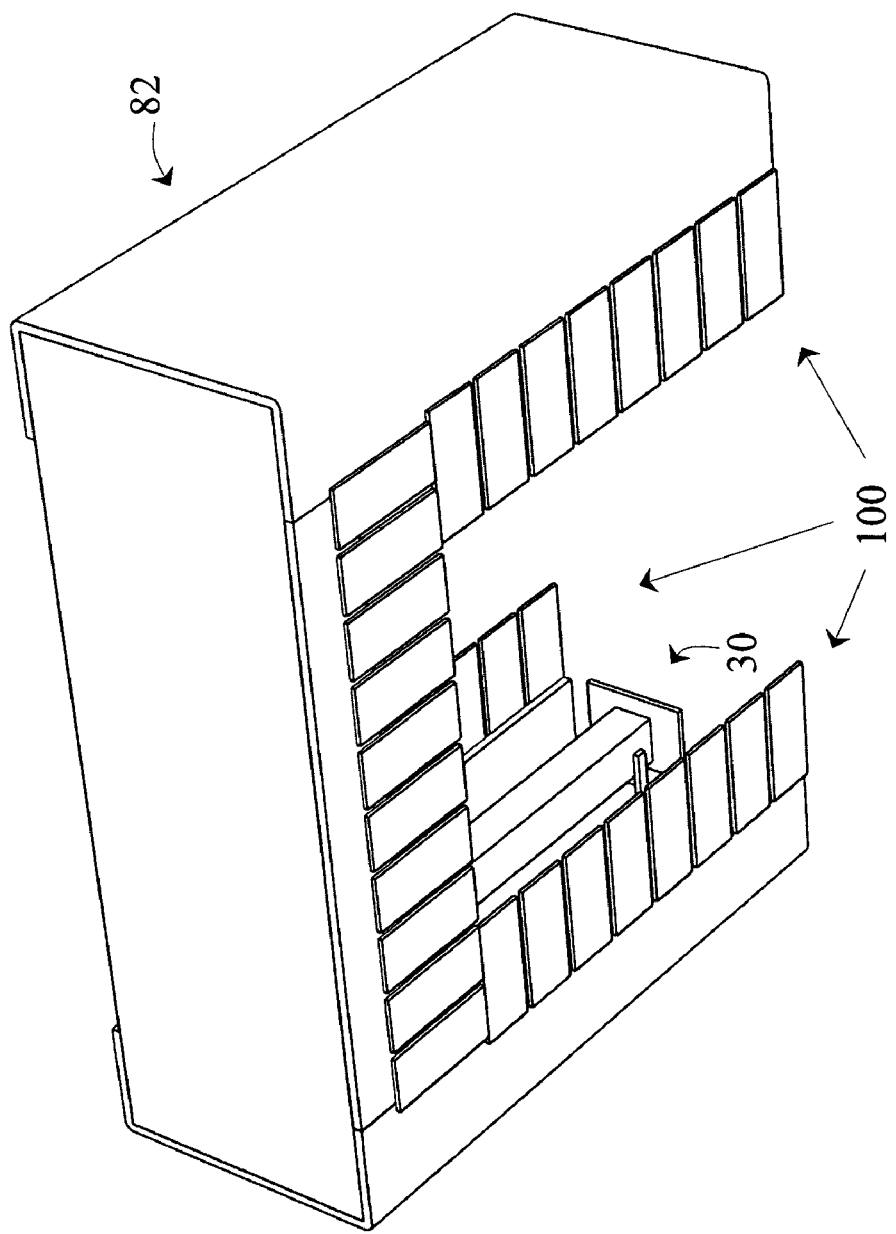

In some embodiments, the washing apparatus 10 may comprise a splash cover to protect a site where the washing apparatus 10 is located from splashes of liquid flowing out of the nozzle 32 and impinging on the vehicle 12. For example, FIG. 10A shows a splash cover 82 comprising a plurality of splash protection panels $84_1 \ldots 84_6$ distributed about the portal 30. FIG. 10B shows a variant of the splash cover 82 that comprises series of vertical flexible splash covering bands 100, which can deflect as the vehicle 12 passes through the portal 30. FIG. 10C shows another variant of the splash cover 82 that comprises series of horizontal and vertical flexible splash covering bands 100, which can deflect as the vehicle 12 passes through the portal 30. Splash protection may help to avoid or minimize humidity issues at the site (e.g., on the walls and ceiling) where the washing apparatus 10 is used, which can be particularly important in residential and other settings.

Figure 11:
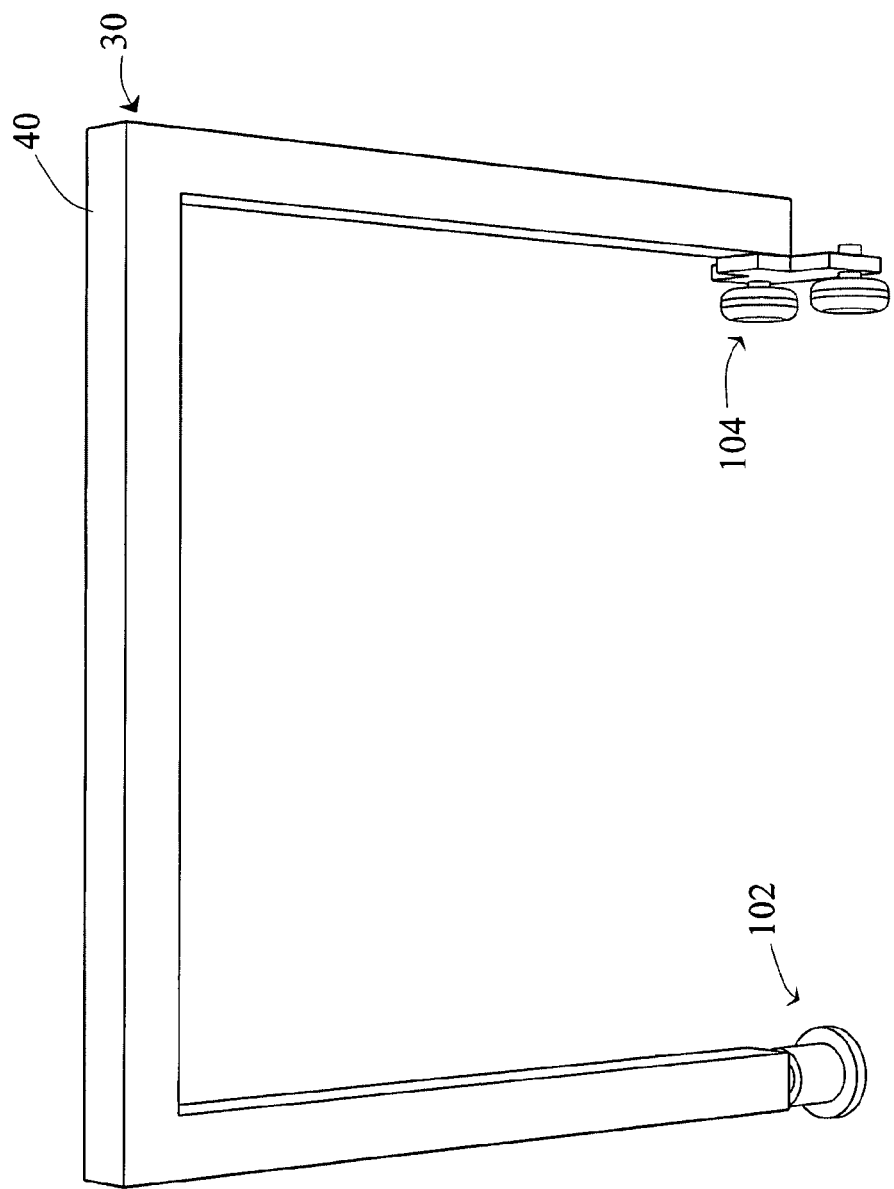
FIG. 11 shows a variant to facilitate storage of an apparatus for washing a vehicle in accordance with an embodiment of the invention.

In some embodiments, the washing apparatus 10 may be configured to be storable. For example, FIG. 11 shows an embodiment in which the portal 30 comprises a pivot 102 on a bottom part of one frame member of the frame 40 and a bogie 104 on a bottom part of another frame member of the frame 40. In other examples, bogies or other wheels may be provided on both bottom parts of the frame 40 to facilitate storage of the portal 30.

Although in embodiments considered herein the portal 30 has various configurations, the portal 30 may be configured in various other ways in other embodiments. For example, in some embodiments, rather than comprising a frame 40 that is self-supporting, the portal 30 may comprise one or more frame members coupled to one or more structural elements, such as a ceiling, a floor, or walls, of a site where the washing apparatus 10 is located.

While in some embodiments considered herein the portal 30 is adapted to move relative to the vehicle 12 by means (such as the bogie $23_1, 23_2$) located at a bottom part of the portal 30, in other embodiments, the washing apparatus 10 may comprise side guides, top guides or a combination thereof for moving the portal 30 relative to the vehicle 12.

Although in embodiments considered herein the washing apparatus 10 comprises various numbers of nozzles 32, the washing apparatus 10 may generally comprise any number of nozzles 32. Also, various types of nozzles may be used in various embodiments, including zero degree nozzles, turbo nozzles, flat spray nozzles, spinner or rotating nozzles, or any other device for causing liquid to impinge on a surface. In addition, in embodiments where the washing apparatus 10 comprises plural nozzles, different ones of these nozzles may be of different types.

While in embodiments considered herein the control apparatus 34 comprises primarily electrical devices (e.g., motors, solenoid valves) to cause motion or activate various components (e.g., carriages, nozzles) of the washing apparatus 10, in other embodiments, the control apparatus 34 may comprise hydraulic, pneumatic or other types of devices to implement these functions.

Since in some embodiments it may use the pressure washer 41 as a source of pressurized liquid, the washing apparatus 10 may comprise one or more connectors adapted to connect to different types of pressure washers. Also, the washing apparatus 10 may comprise a pressure relief valve to avoid damage and/or personal harm when a pressure washer with a pressure rating greater than what the washing apparatus 10 is designed for is connected to the washing apparatus 10.

As it uses relatively low power and liquid flow and pressure in a relatively small space to wash the vehicle 12 by progressively washing each of a series of limited transverse portions 15 of the vehicle 12, the washing apparatus 10 may be particularly useful in a residential setting where such resources limited. However, owing to its simplicity and small space requirements, the washing apparatus 10 may also be useful in other settings such as commercial car wash installations. For example, in some embodiments, a commercial car wash bay operator may, instead of having one bay, have several bays each comprising a washing apparatus such as the washing apparatus 10.

As discussed previously, the washing apparatus 10 can wash the vehicle 12 by progressively washing each of a series of limited transverses portions 15 of a certain width. It can also do several sequential treatments on a given limited transverse portion 15 before cleaning another one. For instance, an example of a sequence that may be done by the washing apparatus 10 on a given limited transverse portion 15 of the vehicle 12 may be: progressively wetting the given limited transverse portion 15 with pressurized liquid, soaping the given limited transverse portion 15, and progressively rinsing the given limited transverse portion 15. Other treatments (e.g., waxing) may also be performed by the washing apparatus 10 in other embodiments. In various embodiments, several different sequences of actions done and activated by the control apparatus 34 may be pre-programmed in the control unit 64 or simply activated or programmed by a user using the remote control device 70 and/or the controls 68 of the control unit 64.

Different embodiments can bring different useful sequencing options. For example, in embodiments where the washing apparatus 10 comprises a first nozzle or set of nozzles for high pressure and a second nozzle or set of nozzles for low pressure, the aforementioned sequence may be modified to decrease the time taken to perform the cleaning of a limited transverse portion 15 of the vehicle 12 by soaping an area that has just been wetted instead of waiting for the wetting of the entire limited transverse portion 15. Although waxing may be performed at the end of a limited transverse portion treatment sequence, it may also be done separately after the entirety of the vehicle 12 has been cleaned.

In some embodiments, the washing apparatus 10 may allow the front side 18 and the rear side 20 of the vehicle 12 to be cleaned by having its nozzle or set of nozzles angled in a way to cover those areas. Additionally or alternatively, one or more extra nozzles specially aligned to treat those regions may also be provided. For example, one or more nozzles located on a floor at a proper angle may be used to wash the front side 18 and the rear side 20 of the vehicle 12. As another example, a transverse support bar holding at least one nozzle and able to move up and down in a transversal plan may be used to direct liquid on the front side 18 and the rear side 20 of the vehicle 12 when required.

Although various embodiments and examples have been presented, this was for the purpose of describing, but not limiting, the invention. Various modifications and enhancements will become apparent to ordinarily skilled persons and are within the scope of the invention, which is defined by the following claims.

The invention claimed is:

1. A washing apparatus for washing a vehicle, the vehicle having a first lateral side, a second lateral side, and a top side between the first lateral side and the second lateral side, said washing apparatus comprising:
a portal for allowing the vehicle to pass therethrough;
at least one nozzle mounted to said portal for directing pressurized liquid toward the vehicle; and
a control apparatus configured to control said at least one nozzle to perform a progressive wash of each of a series of limited transverse portions of the vehicle, each of the limited transverse portions of the vehicle being formed of a limited portion of the first lateral side of the vehicle, a limited portion of the second lateral side of the vehicle, and a limited portion of the top side of the vehicle, the progressive wash of each limited transverse portion of the vehicle being:
i) performed while the limited transverse portion of the vehicle is located in said portal;
characterized in that at least two of the limited portion of the first lateral side of the vehicle, the limited portion of the second lateral side of the vehicle, and the limited portion of the top side of the vehicle which form the limited transverse portion of the vehicle are washed asynchronously,
said washing apparatus being configured to require a driver of the vehicle to move the vehicle between the progressive wash of a given one of the limited transverse portions of the vehicle and the progressive wash of a succeeding one of the limited transverse portions of the vehicle.

2. The washing apparatus claimed in claim 1, wherein the at least two of the limited portion of the first lateral side of the vehicle, the limited portion of the second lateral side of the vehicle, and the limited portion of the top side of the vehicle which form the limited transverse portion of the vehicle are all three of the limited portion of the first lateral side of the vehicle, the limited portion of the second lateral side of the vehicle, and the limited portion of the top side of the vehicle which form the limited transverse portion of the vehicle.

3. The washing apparatus claimed in claim 1, wherein said control apparatus is configured to inform the driver of the vehicle to move the vehicle relative to said portal between the progressive wash of a given one of the given one of the limited transverse portions of the vehicle and the progressive wash of the succeeding one of the limited transverse portions of the vehicle.

4. The washing apparatus claimed in claim 1, wherein the washing apparatus is configured to convey a flow of pressurized liquid at a residential water flow rate to said at least one nozzle.

5. The washing apparatus claimed in claim 1, wherein the washing apparatus is configured to convey a flow of pressurized liquid between a source of pressurized liquid and said at least one nozzle, the source of pressurized liquid having an inlet connectable to a residential water supply.

6. The washing apparatus claimed in claim 5, wherein the source of pressurized liquid is a pressure washer.

7. The washing apparatus claimed in claim 5, wherein the source of pressurized liquid is integrated into the washing apparatus.

8. The washing apparatus claimed in claim 1, wherein a nozzle of said at least one nozzle is movable along said portal to face and direct pressurized liquid toward at least two of the first lateral side of the vehicle, the second lateral side of the vehicle, and the top side of the vehicle.

9. The washing apparatus claimed in claim 1, wherein a nozzle of said at least one nozzle is movable along said portal to face and direct pressurized liquid toward the first lateral side of the vehicle, the second lateral side of the vehicle, and the top side of the vehicle.

10. The washing apparatus claimed in claim 1, wherein said at least one nozzle is a plurality of nozzles.

11. The washing apparatus claimed in claim 10, wherein said plurality of nozzles are movable along said portal, said control apparatus being configured to cause each of said nozzles to move along a different part of said portal to perform the progressive wash of each limited transverse portion of the vehicle.

12. The washing apparatus claimed in claim 10, wherein said nozzles are fixed relative to said portal, said control apparatus being configured to sequentially activate said nozzles to perform the progressive wash of each limited transverse portion of the vehicle.

13. The washing apparatus claimed in claim 1, wherein the vehicle has a front side and a rear side, said control apparatus being configured to control said at least one nozzle to direct pressurized liquid toward at least one of the front side of the vehicle and the rear side of the vehicle.

14. The washing apparatus claimed in claim 1, wherein each of said at least one nozzle is rotatable.

15. The washing apparatus claimed in claim 1, wherein each of said at least one nozzle is a high-pressure nozzle for directing liquid at a relatively high pressure toward the vehicle, the washing apparatus comprising at least one low-pressure nozzle mounted to said portal for directing liquid at a relatively low pressure toward the vehicle.

16. The washing apparatus claimed in claim 15, wherein said control apparatus is configured to cause injection of at least one additive into liquid directed by said at least one low-pressure nozzle toward the vehicle.

17. The washing apparatus claimed in claim 1, wherein said control apparatus comprises a user interface enabling a user to input information pertaining to operation of the washing apparatus.

18. The washing apparatus claimed in claim 17, wherein the user interface comprises a remote control device.

19. The washing apparatus claimed in claim 1, comprising a coupling for connection to a pressure washer to supply a flow of pressurized liquid to said at least one nozzle.

20. The washing apparatus claimed in claim 19, wherein said control apparatus comprises an electrical connector for connection to the pressure washer and is configured to control power applied to the pressure washer via the electrical connector.

21. The washing apparatus claimed in claim 1, comprising pressurizing equipment having a low-pressure inlet for connection to a water supply and a high-pressure outlet for supplying a flow of pressurized liquid to said at least one nozzle.

22. The washing apparatus claimed in claim 1, wherein said control apparatus is configured to cause injection of at least one additive into a flow of pressurized liquid conveyed to said at least one nozzle.

23. The washing apparatus claimed in claim 1, comprising at least one coupling for connection to a pressure washer to supply a flow of pressurized liquid to said at least one nozzle, said control apparatus being configured to cause an additive injector of the pressure washer to inject at least one additive into the flow of pressurized liquid.

24. The washing apparatus claimed in claim 1, comprising an additive injector and at least one container for holding at least one additive, said control apparatus being configured to cause the additive injector to inject an additive of the at least one additive into a flow of pressurized liquid conveyed to said at least one nozzle.

25. The washing apparatus claimed in claim 1, comprising a splash cover to protect a site where the washing apparatus is located from splashes of liquid flowing out of said at least one nozzle.

26. The washing apparatus claimed in claim 1, wherein the vehicle has a longitudinal axis defining a length of the vehicle, the washing apparatus having an extent in a direction parallel to the longitudinal axis of the vehicle that is less than the length of the vehicle.

27. The washing apparatus claimed in claim 1, wherein the portal is a stationary portal.

28. A washing apparatus for washing a vehicle, the vehicle having a first lateral side, a second lateral side, and a top side between the first lateral side and the second lateral side, said washing apparatus comprising:
a portal for allowing the vehicle to pass therethrough;
a nozzle movable along said portal to face and direct pressurized liquid toward the first lateral side of the vehicle, the second lateral side of the vehicle, and the top side of the vehicle; and
a control apparatus configured to control said nozzle such that said nozzle moves along said portal and progressively washes each of a limited portion of the first lateral side of the vehicle, a limited portion of the second lateral side of the vehicle, and a limited portion of the top side of the vehicle which are located in said portal.

29. The washing apparatus claimed in claim 28, wherein, to control said nozzle such that said nozzle moves along said portal and progressively washes each of the limited portion of the first lateral side of the vehicle, the limited portion of the second lateral side of the vehicle, and the limited portion of the top side of the vehicle, said control apparatus is configured to control the nozzle such that the nozzle: moves upwards along said portal and washes gradually higher regions of the limited portion of first lateral side of the vehicle; then moves transversally along said portal and washes the limited portion of the top side of the vehicle starting from the first lateral side of the vehicle until the second lateral side of the vehicle; and then moves downwards along said portal and washes gradually lower regions of the limited portion of the second lateral side of the vehicle.

30. The washing apparatus claimed in claim 28, wherein the limited portion of the first lateral side of the vehicle is a first limited portion of the first lateral side of the vehicle, the limited portion of the second lateral side of the vehicle is a first limited portion of the second lateral side of the vehicle, and the limited portion of the top side of the vehicle is a first limited portion of the top side of the vehicle, said control apparatus being configured to:
inform a driver of the vehicle to move the vehicle relative to said portal after said nozzle has progressively washed each of the first limited portion of the first lateral side of the vehicle, the first limited portion of the second lateral side of the vehicle, and the first limited portion of the top side of the vehicle; and
control said nozzle such that said nozzle moves along said portal and progressively washes each of a second limited portion of the first lateral side of the vehicle, a second limited portion of the second lateral side of the vehicle, and a second limited portion of the top side of the vehicle which are located in said portal.

31. The washing apparatus claimed in claim 28, wherein the vehicle has a longitudinal axis defining a length of the vehicle, the washing apparatus having an extent in a direction parallel to the longitudinal axis of the vehicle that is less than the length of the vehicle.

32. The washing apparatus claimed in claim 28, wherein the portal is a stationary portal.

33. The washing apparatus claimed in claim 28, wherein said washing apparatus being configured to require a driver of the vehicle to move the vehicle between the progressive wash of a given one of the limited transverse portions of the vehicle and the progressive wash of a succeeding one of the limited transverse portions of the vehicle.

34. A washing apparatus for washing a vehicle, the vehicle having a first lateral side, a second lateral side, and a top side between the first lateral side and the second lateral side, said washing apparatus comprising:
a stationary portal for allowing the vehicle to pass therethrough;
at least one nozzle mounted to said stationary portal for directing pressurized liquid from a source of pressurized liquid toward the vehicle, the source of pressurized liquid having an inlet connectable to a water supply having a residential flow rate and pressure; and
a control apparatus configured to control said at least one nozzle to perform a progressive wash of each of a series of limited transverse portions of the vehicle, each of the limited transverse portions of the vehicle being formed of a limited portion of the first lateral side of the vehicle, a limited portion of the second lateral side of the vehicle, and a limited portion of the top side of the vehicle, the progressive wash of each limited transverse portion of the vehicle being:
i) performed while the limited transverse portion of the vehicle is located in said stationary portal; and
ii) characterized in that at least two of the limited portion of the first lateral side of the vehicle, the limited portion of the second lateral side of the vehicle, and the limited portion of the top side of the vehicle which form the limited transverse portion of the vehicle are washed asynchronously.

35. The washing apparatus claimed in claim 34, wherein the source of pressurized liquid is a pressure washer.

36. The washing apparatus claimed in claim 34, wherein the source of pressurized liquid comprises pressurizing equipment integrated with the washing apparatus.

37. The washing apparatus claimed in claim 34, wherein the vehicle has a longitudinal axis defining a length of the vehicle, the washing apparatus having an extent in a direction parallel to the longitudinal axis of the vehicle that is less than the length of the vehicle.

* * * * *